US012670015B2

(12) United States Patent
Chandrasekaran et al.

(10) Patent No.: US 12,670,015 B2
(45) Date of Patent: Jun. 30, 2026

(54) DETACHED GLOBAL SCHEDULER

(71) Applicant: NetApp, Inc., San Jose, CA (US)

(72) Inventors: Sivakumar Chandrasekaran, Fremont, CA (US); Vikash Kumar Jha, San Jose, CA (US); Pranith Kiran Kouda, San Jose, CA (US); Rujuta Antarkar, Fremont, CA (US); Anuja Inamdar, San Jose, CA (US); Raghvendra Dixit, San Jose, CA (US); Ajay Kushwah, San Ramon, CA (US)

(73) Assignee: NetApp, Inc., San Jose, CA (US)

( * ) Notice: Subject to any disclaimer, the term of this patent is extended or adjusted under 35 U.S.C. 154(b) by 924 days.

(21) Appl. No.: 17/588,901

(22) Filed: Jan. 31, 2022

(65) Prior Publication Data

US 2023/0244522 A1 Aug. 3, 2023

(51) Int. Cl.
*G06F 9/44* (2018.01)
*G06F 9/48* (2006.01)
*G06F 9/50* (2006.01)

(52) U.S. Cl.
CPC .......... *G06F 9/4881* (2013.01); *G06F 9/5011* (2013.01); *G06F 2209/503* (2013.01)

(58) Field of Classification Search
CPC ................ G06F 9/4881; G06F 9/5011; G06F 2209/503; G06F 3/061; G06F 3/0659; G06F 3/065; G06F 3/067
See application file for complete search history.

(56) References Cited

U.S. PATENT DOCUMENTS 7,752,491 B1   7/2010  Liikanen et al.
7,752,622 B1 *  7/2010  Markov ................ G06F 9/4881
                                                          718/103

8,060,395 B1 *  11/2011  Frasher .............. G06Q 10/1093
                                                          705/7.18
9,448,842 B1 *  9/2016  Lemarinier ........... G06F 9/5022
9,703,800 B1 *  7/2017  Korshunov ............. H04L 63/08
2004/0125738 A1   7/2004  Lee et al.
                (Continued)

OTHER PUBLICATIONS

Aghayev, et al., "Skylight—A Window on Shingled Disk Operation," 13th USENIX Conference on File and Storage Technologies (FAST '15), Santa Clara, CA, USA, Feb. 16-19, 2015, pp. 135-149.
Amer, et al., "Data Management and Layout for Shingled Magnetic Recording," IEEE TMAG, 2011, pp. 1-7.
Amer, et al., "Design Issues for a Shingled Write Disk System," IEEE MSST, 2010, pp. 1-12.
                (Continued)

*Primary Examiner* — Hang Pan

(74) *Attorney, Agent, or Firm* — Jaffery Watson Hamilton & DeSanctis LLP

(57) ABSTRACT

Systems, methods, and machine-readable media are disclosed for a global scheduler that manages jobs across nodes of one or more clusters. The global scheduler receives a request to replicate a volume from a first storage node to a second storage node, the global scheduler handling job scheduling for one or more storage operating systems across one or more clusters. The global scheduler stores a new job in a job queue based on the request to replicate the volume. The global scheduler determines that the new job has a higher priority than other jobs in the job queue. The global scheduler allocates one or more resources of the first storage node to the new job in response to determining that the new job has a higher priority than other jobs in the job queue. The global scheduler sends an instruction to run the new job.

20 Claims, 10 Drawing Sheets

(56)          References Cited

U.S. PATENT DOCUMENTS

| | | | |
|---|---|---|---|
| 2006/0112388 A1* | 5/2006 | Taniguchi | G06F 9/5083 |
| | | | 718/100 |
| 2007/0038496 A1* | 2/2007 | Parvatikar | G06Q 10/0633 |
| | | | 705/7.27 |
| 2008/0150683 A1* | 6/2008 | Mikan | G07C 9/00309 |
| | | | 340/5.31 |
| 2011/0099420 A1 | 4/2011 | Macdonald Mcalister et al. | |
| 2015/0135005 A1 | 5/2015 | Hsu-Hung et al. | |
| 2016/0216905 A1* | 7/2016 | Yazdani | G06F 3/0619 |
| 2019/0163534 A1* | 5/2019 | Park | G06F 9/4881 |
| 2019/0235972 A1* | 8/2019 | Bono | G06F 16/1824 |
| 2019/0243547 A1* | 8/2019 | Duggal | G06F 3/0613 |
| 2021/0081249 A1* | 3/2021 | Gao | G06F 9/5038 |
| 2022/0334871 A1* | 10/2022 | Krishnamoorthy | G06F 21/53 |
| 2023/0333887 A1* | 10/2023 | White | G06F 9/5033 |

OTHER PUBLICATIONS

Cassuto, et al., "Indirection Systems for Shingled-Recording Disk Drives," IEEE MSST 2010, Research Gate, DOI: 10.1109/MSST. 201 0.5496971, May 7, 2010, pp. 1-45.

Dhas, et al., "Evaluation of Nilfs2 for Shingled Magnetic Recording (SMR) Disks," Technical Report FSL-14-03, 2014, pp. 1-6.

Gibson, et al., "Directions for Shingled-Write and Two-Dimensional Magnetic Recording System Architectures: Synergies with Solid-State Disks," Parallel Data Lab Technical Report CMU-PDL-09-104, Carnegie Mellon University, May 2009, pp. 1-3.

Jin, et al., "HiSMRfs: a High Performance File System for Shingled Storage Array," IEEE MSST, 2014, pp. 1-6.

Lin, et al., "H-SWD: Incorporating Hot Data Identification into Shingled Write Disks," IEEE MASCOTS , 2012, pp. 1-10.

Wan, et al., "High Performance and High Capacity Hybrid Shingled-Recording Disk System," IEEE CLOUD , 2012, pp. 173-181.

\* cited by examiner

300

600

700

DETACHED GLOBAL SCHEDULER

TECHNICAL FIELD

The present description relates to job scheduling in a storage system. More specifically, the present description relates to systems and methods for task scheduling across a plurality of nodes in clusters and regions of nodes.

BACKGROUND

Cloud computing involves the on-demand availability of cloud resources, such as storage and compute resources, to requesting users. Often, cloud compute providers may make these cloud resources available to users with an accompanying storage solution. The cloud resources often include the ability to perform scheduled tasks. The different storage solutions provided with cloud resources may perform the scheduled tasks under the control of an operating system scheduler.

Problems arise, however, because of the added complexity of coordinating resources across multiple storage nodes, such as across multiple storage clusters and/or regions where each cluster includes multiple storage nodes. For example, a volume replication task may require a source storage node to communicate with a destination storage node in a different cluster or region to coordinate the replication of a volume from the source storage node to the destination storage node. But current approaches do not provide a global view or global control to support this requirement. This results in any operating system scheduler in any region or cluster lacking a holistic view of the entire system (across clusters and regions).

This lack of a global view and global control may create problems with identifying available resources and ensuring that task priorities and customer fairness concerns are met. Accordingly, there is a need for solutions that provide a holistic view of an entire system, across clusters and regions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method includes receiving, by a global scheduler, a request to replicate a volume from a first storage node to a second storage node. The global scheduler handles job scheduling for one or more storage operating systems across one or more clusters. The method further includes storing, by the global scheduler, a new job in a job queue based on the request to replicate the volume. The method further includes determining, by the global scheduler, that the new job has a higher priority than other jobs in the job queue. The method further includes allocating, by the global scheduler, one or more resources of the first storage node to the new job in response to determining that the new job has a higher priority than other jobs in the job queue. The method further includes sending, by the global scheduler to a storage node, an instruction to run the new job.

In an additional aspect of the disclosure, a computing device includes a memory containing machine readable medium comprising machine executable code having stored thereon instructions for performing a method of scheduling jobs across a plurality of storage nodes. The computing device further includes a processor coupled to the memory, the processor configured to execute the machine executable code to cause the processor to receive a request perform a task according to a schedule. The processor can be further configured to store a first job in a job queue, the first job being based on the request to perform the task. The processor can be further configured to determine that the first job has a higher priority than other jobs in the job queue. The processor can be further configured to pause a second job in response to a determination there are insufficient resources to run the first job, the second job having a lower priority than the first job. The processor can be further configured to initiate the first job using resources made available in response to the pausing the second job.

In an additional aspect of the disclosure, a non-transitory machine-readable medium having stored thereon instructions for performing a method of scheduling jobs across a plurality of storage nodes, when executed by at least one machine, causes the at least one machine to receive a request to run a first job according to a provided schedule. The instructions further cause the machine to publish the first job to a job queue, the job queue being one of a plurality of job queues, the job queue including a plurality of jobs of a similar type to the first job. The instructions further cause the machine to allocating, in response to the first job being ready to run, an additional amount of bandwidth to a second job of the plurality of jobs, the second job running on a storage node of the plurality of storage nodes. The instructions further cause the machine to send an instruction to a storage node of the plurality of storage nodes to run the first job on the storage node after the second job has completed.

Other aspects will become apparent to those of ordinary skill in the art upon reviewing the following description of exemplary embodiments in conjunction with the figures. While one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

The present disclosure is best understood from the following detailed description when read with the accompanying figures.

DETAILED DESCRIPTION

Figure 1:
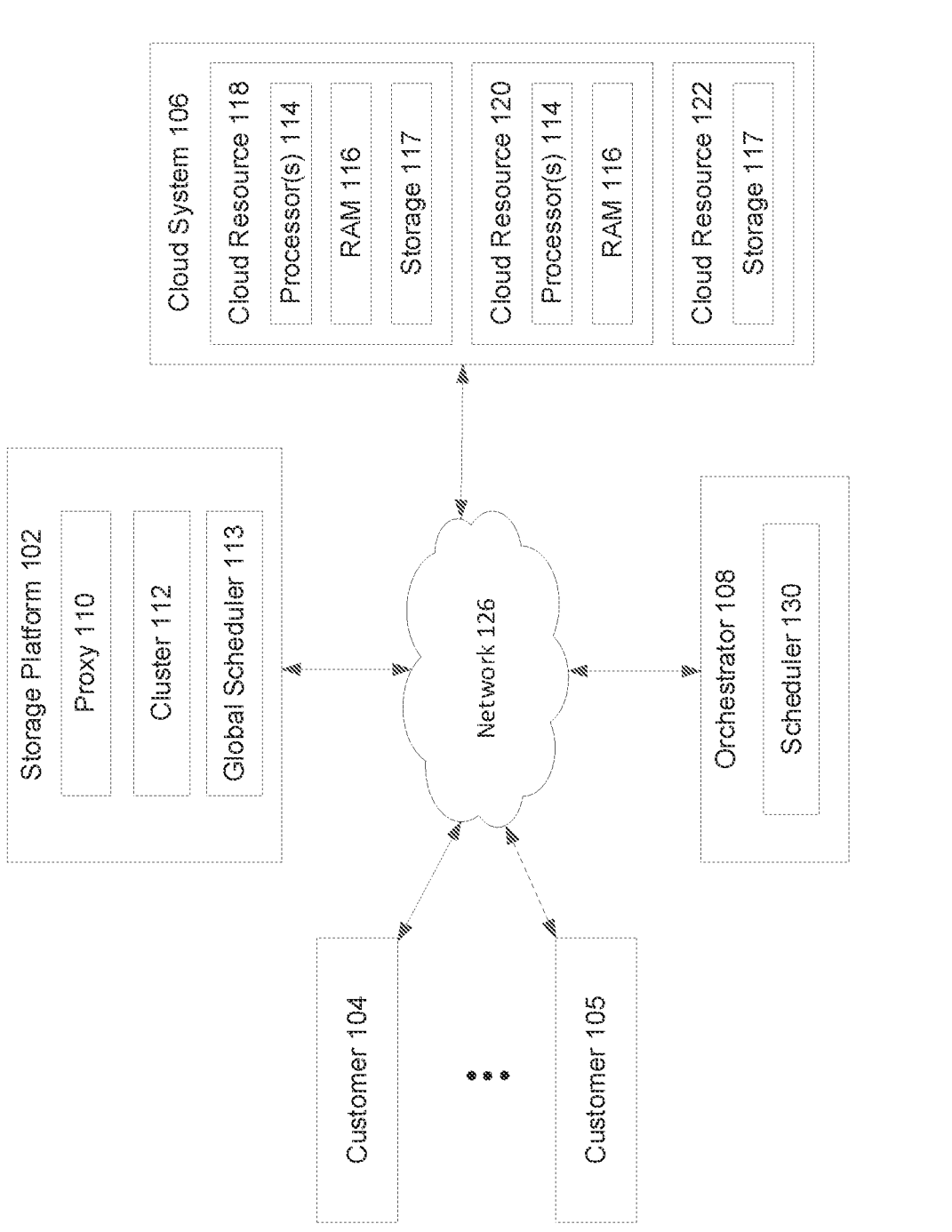
FIG. 1 illustrates a cloud provider environment according to some embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for task scheduling across a plurality of nodes in clusters and regions of nodes. This may be used, in an example, in a cloud storage platform environment that also operates to place volumes at optimally determined locations on the storage platform. Embodiments of the present disclosure may be discussed with reference to cloud storage platforms. This is for simplicity of discussion only. Embodiments of the present disclosure are applicable to storage systems generally, such as cloud storage platforms, server storage platforms, on-premise storage platforms, etc. The examples described below may refer to cloud storage platforms to provide illustration of details of the disclosure.

For example, a global scheduler serves to manage scheduled and on-demand disaster recovery tasks (e.g., an internal job controller that is not intended to interact with customers). These tasks may include the lifecycle management of scheduled volume replication using cross region replication, scheduled backup to cloud, on-demand backup to, and restore from an object store in the cloud, updating cryptography keys, and other suitable tasks. As used herein, cross region replication (CRR) may use disaster recover technology (e.g., SnapMirror) designed for failover from primary storage to secondary storage at a geographically remote site. In some examples, CRR may be between different regions. Regions may be separated either physically or logically.

The global scheduler may be responsible for the lifecycle management of all the volume replication and backup jobs and has a holistic picture of all these jobs across storage clusters (e.g., ONTAP) within a region. This high-level view of the jobs is used to provide customer fairness for backup and replication related operations according to the service tier of the jobs and it does this by providing at least session management, priority scheduling, network bandwidth management, and on-demand high priority job management.

The global scheduler may use session management to keep track of every session (e.g., SnapMirror sessions) available to the cloud system as well as how many sessions are currently in use. This enables the global scheduler to efficiently manage the limited number of sessions per storage controller (e.g., ONTAP controller), on all storage clusters across all regions. The global scheduler may also utilize the holistic view across clusters and regions for priority scheduling. Priority scheduling may enable lower priority running jobs to be cooperatively preempted by a higher priority scheduled job so as to keep both jobs within the limit of their respective service levels.

Further, the global scheduler may manage the network bandwidth to intelligently manipulate the network bandwidth of running jobs so as to efficiently manage various dynamic schedules. For instance, increasing the network bandwidth of a running job will cause it to complete sooner, thereby allowing a job waiting for a free session to start according to schedule.

Yet further, on-demand high priority job management of the global scheduler may manage on-demand, high priority jobs such as an on-demand ad-hoc backup request, or an on-demand backup restore initiated by the customer. For example, the global scheduler may provide the ability to intelligently preempt lower-priority jobs as well as manipulate the network bandwidth of running jobs. This may enable the global scheduler, in a best effort manner, to balance resources with the intent for the supported services (e.g., CRR, Backup) to achieve customers' recovery point objective (RPO) and recovery time objective (RTO) objectives. As an example, the global scheduler may consider several constraints that affect job scheduling in order to meet the customer's RPO and RTO objectives for DP volumes. First, the global scheduler may consider the total volumes vs. the total available sessions (e.g., SnapMirror sessions) on each storage node (e.g., ONTAP node). Second, the global scheduler may aggregate replication bandwidth available on each storage node (e.g., ONTAP node) and each storage cluster (e.g., ONTAP cluster).

Replication technology that has been designed for an on-premises use case imposes certain restrictions on how it can be deployed. An exemplary restriction is the number of active transfers allowed by a replication technology (e.g., SnapMirror for ease of reference herein) for each ONTAP node. As an example, a SnapMirror relationship may be established at the volume level and consist of two replication operations, one on the source system and the other on the destination. In some examples, the two replication operations may be considered a single operation that is driven by the destination system. In some embodiments, during an active transfer, both the source node session availability count and the destination node session availability count decreases by 1. In some other embodiments, during an active transfer only the destination node session availability count decreases by 1. In an example, a single node of a storage cluster (e.g., Azure® NetApp Files (ANF) cluster) may support up to 100 active sessions at any point in time and that same node may support up to 1000 ANF volumes for hosting customer data. Accordingly, at any given point in time in this example, the replication technology might be constrained to replicating approximately 10% of the volumes hosted on the node. While this may not be an architecture-imposed restriction, it may be a qualification point beyond which the replication transfers are seen as starting to impact the ability to transfer the primary data by the node. While the limits may be increased to some higher number, there will always be some limit imposed such that a fraction of volumes on a heavily loaded node could concurrently be in an active replication transfer state. The global scheduler according to embodiments of the present disclosure provides an improvement over this current technology by effectively managing the available replication sessions across the storage nodes on multiple clusters.

Another example of restrictions on deployment relates to network constraints. Typically, cross region replication may be between peered region pairs (e.g., Azure® regions as an example for sake of discussion) that are connected through a global backbone networks (e.g., global VNet peering). While the global backbone network may provide a bandwidth boost, there may be a ceiling on how much total data can be transferred between the two clusters in a given unit of time (i.e., net available replication bandwidth). This may often be less than the total data that has changed on the primary cluster in the same unit of time for replication purpose, across aggregates of all customer volumes. There may also be additional factors impacting the dynamic replication network bandwidth ceiling since the replication traffic will share network resources (e.g., the Top of Rack (TOR) switch) with the primary data. It is desirable for primary data traffic to take higher priority in most, if not all, cases. A good example of such a scenario may be a sudden burst of read traffic on a primary volume driven by some sequential workload such as backup or scanner. The global scheduler according to embodiments of the present disclosure provides an improvement over current technology through a holistic view of the available bandwidth across storage nodes in one or more storage clusters and across regions. This holistic view allows the global scheduler to more effectively utilize the available bandwidth across the entire system.

Embodiments of the present disclosure provide multiple advantages and benefits. The global scheduler provides functionality to holistically monitor and manage different types of jobs performed by storage nodes across multiples storage nodes, multiple storage clusters, and multiple storage regions. The global scheduler improves the performance of the storage nodes when compared to current schedulers operating on the individual storage nodes, due to the holistic view of the resources of the different storage nodes and storage clusters across the different regions. The global scheduler may also ensure that the resources are available to run the scheduled jobs to ensure compliance with customer service level, customer fairness, and workload balance. The global scheduler may adjust the resources to ensure that jobs are run when scheduled. Thus, embodiments of the present disclosure improve not only the operation of an overall cloud provider system, but also the operations at most or all of the nodes within that system due to better balance between nodes.

FIG. 1 illustrates a cloud provider environment 100 according to some embodiments of the present disclosure. The cloud provider environment 100 may include, among other things, a storage platform 102, one or more customers 104, 105, a cloud system 106, and an orchestrator 108. These aspects of the cloud provider environment 100 may communicate with each other via a network 126. The network 126 may be, for example, the Internet, a local area network, a wide area network, and/or a wireless network (to name a few examples). The network 126 may include a variety of transmission media including cables, optical fibers, wireless routers, firewalls, switches, gateways, and/or other devices to facilitate communications between one or more of the aspects of the environment 100.

Cloud system 106 may be a provider of cloud infrastructure for one or more customers 104, 105 (representing generally any number of customers, with two as a simple example). Cloud system 106 may provide a variety of cloud computing solutions, such as infrastructure as a service (IaaS), software as a service (SaaS), and/or platform as a service (PaaS) as some examples. For example, cloud system 106 may be a public cloud provider, examples of which include Amazon Web Services™ (AWS™) Microsoft® Azure®, and Google Cloud Platform™. These are by way of illustration. The cloud system 106 may represent a multitenant cloud provider that may host a variety of virtualization tools that customers 104, 105 may request to host or otherwise run one or more applications (e.g., via the network 126 and/or orchestrator 108). Alternatively (or additionally), the cloud system 106 may represent a private cloud provider, such as an enterprise cloud for a given organization.

Cloud system 106, generally, may provide infrastructure including any set of resources used for executing one or more containers, virtual machines, or other hosted virtualization tool(s). Resources may include CPU resources, memory resources, caching resources, storage space resources, communication capacity resources, etc. that a virtualization tool such as a container may use for execution of one or more workloads for customers 104, 105. These resources are illustrated in FIG. 1 as cloud resources 118, 120, and 122 of cloud system 106. These may represent any number of cloud resources in any of a variety of combinations. As just one example, the cloud resources 118-122 may be in the form of one or more AWS EC2™ or S3™ instances, or other instance type from a cloud provider.

As an example, cloud resource 118 may include a processor 114, RAM 116 and storage 117. Processor 114, which may be one or more processors such as multiple processors. The processor 114 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 114 may also be implemented as a combination of computing devices, e.g., a combination of a DSP and a microprocessor, a plurality of microprocessors, one or more microprocessors in conjunction with a DSP core, or any other such configuration.

The processor 114 is connected to RAM 116 to execute one or more instructions stored in the RAM 116 by the processor 114. The RAM 116 may include a cache memory (e.g., a cache memory of the processor 114) and random access memory (RAM). The processor 114 and the RAM 116 may be connected to storage 117, which provides the non-volatile storage for instructions executed in the RAM 116 by the processor 114, may include magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. The stored instructions may include instructions that, when executed by the processor 114, cause the processor 114 to perform the operations described herein, such as for hosting one or more containers. Instructions may also be referred to as machine executable code. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

As a further example, cloud resource 120 may include only the processor 114 and RAM 116, with the storage 117 located remotely. As yet a further example, cloud resource 122 may include only storage 117, which operates as remote storage for cloud resource instances including a processor 114 and RAM 116 or for other devices connected via the network 126 to the cloud system 106, such as the storage platform 102.

For example, a customer 104 (or 105, but referring to 104 for simplicity herein) may run one or more virtualization layers, such as virtual machines and/or containers on one or more cloud resources 118-122 of cloud system 106, via network 126. For example, a container may use a level of system level virtualization, such as by packaging up application code and its dependencies (e.g., system tools, system libraries and/or settings, etc.) so that the hosted application can be executed reliably on one or more computing platforms of the cloud system 106 (as an example). Some examples of software may include, for example, Red Hat® OpenShift®, Docker® containers, chroot, Linux®-VServer, FreeBSD® Jails, HP-UX® Containers (SRP), VMware ThinApp®, etc. Containers may run on the cloud system 106 on a host operating system directly, or may be run via another layer of virtualization (such as within a virtual machine).

Customers 104, 105 may orchestrate one or more containers using the cloud resources 118-122 using orchestrator 108. Orchestration may refer to scheduling containers within a predetermined set of available infrastructure represented by the cloud resources 118-122. The orchestrator 108 may be used to determine the required infrastructure based upon the needs of containers being executed/requested for execution. For example, orchestrator 108 may map each container to a different set of cloud resources 118-122, such as by selecting a set of containers to be deployed on each cloud resource 118-122 that is still available for use. Examples of orchestrator 108 may include Kubernetes®, Docker Swarm®, AWS Elastic Container Service™, etc. Generally, it may refer to a container orchestrator that is executed on a host system of cloud system 106, such as via processor(s) 114, RAM 116, storage 117, etc., using a host operating system. The orchestrator 108 may further include a scheduler 130. Scheduler 130 may be used to make an actual request for infrastructure and allocation of containers to the infrastructure to the cloud system 106. An example of a scheduler 130 may include a Kubernetes® scheduler, which may execute on a host connected to network 126, either on the same hardware resources as orchestrator 108 or on other hardware and/or software resources.

The environment 100 may further include storage platform 102. Storage platform 102 is illustrated as separate from cloud system 106, though it may be an example of a cloud resource (e.g., cloud resources 118, 120, 122), as storage platform 102 may be hosted and/or managed by a different entity than the cloud system 106 (e.g., a different provider for storage than a public cloud provider), but operate in cooperation with the cloud system 106 to provide storage services to one or more customers 105, 106. The storage platform 102 may include a proxy 110, a cluster 112, such as, for example, a Kubernetes® cluster or a Docker Swarm®, and a global scheduler 113. These may be executed by a processor or multiprocessor (such as one or more of the examples given above with respect to processor 114), RAM (such as one or more of the examples given above with respect to RAM 116) and storage (such as one or more of the examples given above with respect to storage 117). These may include instructions which, when executed by the processor(s) for the storage platform 102, cause the processor to perform the operations described herein with respect to collecting data on one or more resources, making job scheduling determinations (e.g., type of job, preemption, bandwidth management, etc.), and so on.

For example, while illustrated as separate from cloud system 106, the cluster 112 may, itself, be hosted by the cloud system 106 as a software-defined environment in which the storage platform 102 may make storage decisions according to embodiments of the present disclosure. In other examples, the storage platform 102 may include its own processor(s), memory(ies), and other resources that interface with the cloud system 106 with the instructions. In yet other examples, the cluster 112 may be hosted on a system that is external to both the storage platform 102 and the cloud system 106. The cloud system 106 and storage platform 102 may be jointly owned or owned by separate entities. The cloud system 106 and storage platform 102 may be co-located to improve storage access speed or they may be located in different data centers. The cloud system 106 and the storage platform 102 may work jointly to provide storage options to customers 104, 105 that are utilizing the capabilities of cloud system 106. The cloud system 106 may provide seamless access to the storage platform 102 for ease of use by the customers 104, 105.

According to embodiments of the present disclosure, storage platform 102 may function as a back-end storage service for cloud system 106. That is, storage platform 102 may support cloud system 106 in providing storage as a service (SaaS) to customers, including customers 104, 105. Storage platform 102 may include a storage operating system (OS) that specializes in providing advanced storage functions, such as deduplication, compression, synchronization, replication, snapshot creation/management, disaster recovery, backup and archive, high availability storage, cloning functionality, data tiering, encryption, multi-platform access, etc. In an example, the storage OS may execute within a storage virtual machine, a hyperscaler, or other computing environment. The storage OS may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by a node, a cloud object, etc.). Each storage object may be associated with a unique identifier that uniquely identifies the storage object. For example, a volume may be associated with a volume identifier uniquely identifying that volume from other volumes. The storage OS also manages client access to the storage objects.

The storage OS may implement a file system for logically organizing data. For example, the storage OS may implement a write anywhere file layout for a volume where modified data for a file may be written to any available location. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.). Other representations may be used instead or in addition. The storage OS may allow client devices to access data (e.g., through cloud system 106 in some examples) stored within the storage platform 102 using various types of protocols, such as a Network File System (NFS) protocol, a Server Message Block (SMB) protocol and Common Internet File System (CIFS), and Internet Small Computer Systems Interface (iSCSI), and/or other protocols.

In some examples, customers 104, 105 using cloud system 106 may request to schedule a job (e.g., volume replication, volume backup, rekey, etc.) via cloud system 106. The cloud system 106 may, in turn, pass the job request to storage platform 102 for processing and handling. For example, cloud system 106 may offer different job types to customers 104, 105, including a storage resource available as cloud resource 118/120/122 (where offered/available), which may have limited, if any, functionality as compared to functionality offered by storage platform 102 implementing a storage OS (more generally, one or more storage OS's among one or more nodes, clusters, and/or regions). As another example, the cloud system 106 may specialize in cloud computing resources and storage platform 102 may specialize in cloud storage resources.

Generally, customers 104, 105 that utilize cloud system 106 may schedule jobs that utilize resources of multiple cloud resources 118/120/122 and/or cluster 112. For example, a customer 104, 105 may request a job to replicate a volume from a first cloud resource, such as cloud resource 118 to a second cloud resource, such as cloud resource 120. In prior approaches, a scheduler of the host operating system on the first cloud resource 118 would have communicated with the scheduler on the second host operating system on the second cloud resource 120 to coordinate the volume replication. According to embodiments of the present disclosure, however, the global scheduler 113 may track and manage scheduled jobs across the cloud resources 118/120/122 and the cluster 112. By tracking the scheduled jobs, the global scheduler 113 has a holistic view of the resources available across the different cloud resources 118/120/122 and the cluster 112 as well as global control.

As described herein, the global scheduler 113 may provide better optimization of jobs scheduled by customers 104,105 across the nodes and clusters of the storage platform 102 and cloud system 106. Depending on a variety of factors, storage platform 102 may manage the scheduled jobs of customer 104 such that customer 104 does not need to know what resources are available or that storage platform 102 is a different entity from cloud system 106. Customers 104, 105 therefore benefit from the specialized job scheduling capabilities of storage platform 102 without any extra work by customers 104, 105. Such a separation further allows for management of scheduled jobs across one or more hosts, nodes, clusters, and/or regions.

For example, the global scheduler 113 in the storage platform 102 may track and/or manage jobs running on the cluster 112. In some embodiments, the global scheduler 113 may be a single application running on storage platform 102. In some other embodiments, the global scheduler 113 may include one or more different services, or applications, running cooperatively to accomplish the job scheduling and management tasks. The customers 104, 105 may request the replication of a volume, for example, from a first storage node to a second storage node. A volume service may receive the request and forward the request to the global scheduler 113. The global scheduler 113 may prepare the requested job to be run by a cloud resource 118/120/122. As part of this preparation, the global scheduler 113 may determine whether there are sufficient resources to perform the requested job on the first storage node and the second storage node. In response to determining that there are sufficient resources, the global scheduler 113 may run the job on the first and second storage nodes within the storage platform 102. By managing the resources across the different storage nodes, the global scheduler 113 may better utilize available resources to run the scheduled jobs. The global scheduler 113 may identify available sessions and bandwidth for running a scheduled job. The global scheduler 113 may send a message to a storage node to run the selected job using the identified session and bandwidth.

The global scheduler 113 may also identify running jobs that may be preempted to allow a higher priority job to run. As part of this, the global scheduler 113 may pause a running job and reassign the session and bandwidth to be used to run a different job. This ensures that higher priority tasks are run in a timely manner. The global scheduler 113 may also identify a task that is scheduled to run in situations where the global scheduler 113 is unable to identify a preemptible running task among those tasks running at the time. In this situation, the global scheduler 113 may determine to increase the bandwidth available to one of the running tasks to allow the running task to complete sooner. By completing the running task sooner, the global scheduler ensures that a session is available to run the scheduled task as requested.

As a further example, the global scheduler 113 may monitor and update volume replication relationships throughout the lifecycle of the volume. Notifications may be sent to the global scheduler 113 when a volume is mounted, when a replication relationship is deleted, when a replication relationship is broken, when a resynchronize operation is started, and when a relationship is removed, to name a few. In these scenarios, a cloud volume service (e.g., cloud resource 118) may notify the global scheduler 113 of the change through an application program interface (API) of the global scheduler 113. The global scheduler 113 may then perform the necessary operations to ensure that the scheduled jobs and the relationships used by those jobs are kept up to date.

The global scheduler 113 may be implemented by multiple services that are designed to work together to provide the functionality of the global scheduler. These services may be cloud resources 118/120/122. These services may include a global scheduler (GS) replication service to service as an endpoint for replication calls, a GS database cluster to keep track of schedules, status, etc., a GS dispatcher to query the database and maintain a jobs pipeline via GS task priority queues (queues for on-demand initialize tasks, and replication tasks that are ready to be picked up by the GS core/job processor), a GS core/job processor that selects the jobs from the queues after obtaining a replication session slot and allocation of bandwidth, a GS session manager that (maintains a list of free and in-use replication sessions per node, a GS monitoring service that periodically queries the job status from all nodes and updates with the results, and a GS supervisor service that keeps storage and metadata in sync. Separating the global schedular into multiple different services such as those listed improves the extensibility of the global scheduler, allowing new features to be added with minimal changes to the designed functionality.

Figure 2:
FIG. 2 illustrates a storage platform architecture according to some embodiments of the present disclosure.
Figure 2:
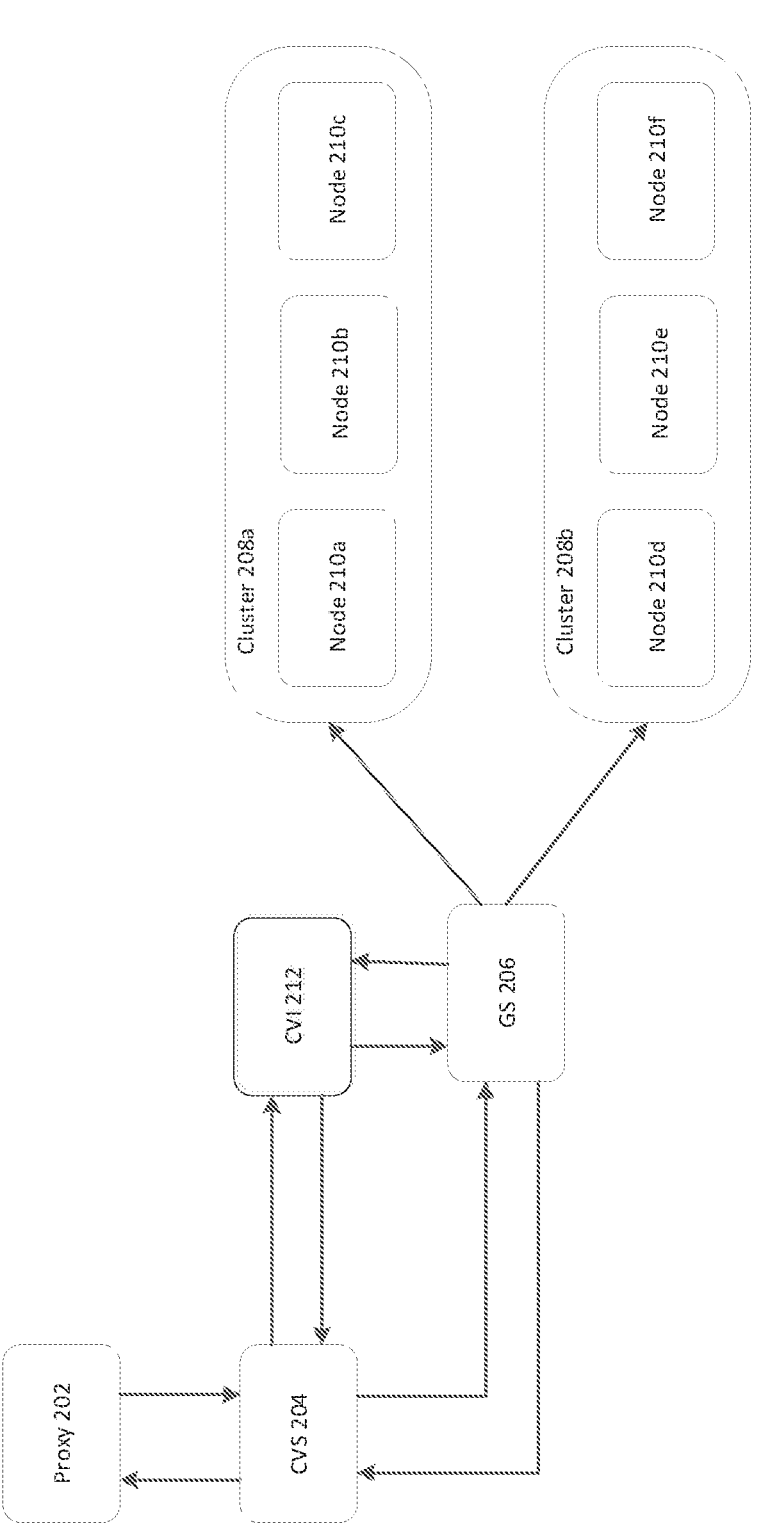

Turning now to FIG. 2, details of a storage platform 200 are illustrated according to embodiments of the present disclosure. Storage platform 200 may include a proxy 202, a cloud volume service (CVS) 204, a global scheduler (GS) 206, clusters 208a and 208b, storage nodes 210a-210f, and a cloud volume infrastructure API (CVI) 212.

The storage platform 200 may be an example of the storage platform 102 discussed above in FIG. 1. As introduced in FIG. 1, the storage platform 200 may be a back-end storage service for the cloud system 106. The cloud system 106 may communicate with the storage platform 200 through proxy 202. Proxy 202 may be an example of proxy 110 illustrated in FIG. 1. Examples of proxy 202 may include a Microsoft Azure Resource Provider or a NetApp Cloud Volume Proxy (to name just a few examples). Generally, the proxy 202 may provide one or more APIs for the cloud system 106 to communicate with CVS 204 of the storage platform 200.

The proxy 202 may be a single component, either software or hardware, or it may be multiple components (including a combination of software and hardware). That is, there may be multiple proxies 202, where, in an example, there may be one proxy 202 to receive job requests from a Microsoft® Azure server and there may be another proxy 202 to receive job requests from an Amazon AWS® server. In other examples, one proxy 202 may receive job requests from multiple different cloud platforms. Reference will be made to a single proxy 202 for simplicity. The proxy 202 may receive a job request to create or update a volume replication, backup, or other scheduled job. The request may come from a user (e.g., customers 104, 105) or from another system, such as, for example, the cloud system 106 of FIG. 1. The proxy 202 may then convert the job request format to a common job request format (such as an API call) and send the converted job request to the CVS 204. The job request to the CVS 204 may be made through an API published by the CVS 204.

The CVS 204 may provide an API for creating, deleting, and/or modifying jobs on the storage platform 200. There may be one or more CVS 204 instances within the storage platform 200. Additionally, there may be one or more storage platforms, each including one or more CVS 204 instances. The CVS 204 may allow the requestor to select among many different job options including, but not limited to, volume replication, volume backup, and device rekey. The CVS 204 may create or modify the requested job according to the request received from the proxy 202. The CVS 204 may send the job request to the global scheduler 206 for scheduling and job management according to embodiments of the present disclosure.

Clusters 208a and 208b may be examples of the cluster 112 described above in FIG. 1. For example, clusters 208a and 208b may each be a Kubernetes® cluster. In some examples, each cluster 208a, 208b may be hosted on storage platform 102 (FIG. 1), while in other examples each cluster 208a, 208b may be hosted in cloud platform 106 (FIG. 1), while in yet other examples each cluster 208a, 208b may be hosted on a system external to storage platform 102 and cloud platform 106. CVS 204, CVS 212, GS 206, and Clusters 208a, 208b may be running in a containerized environment, such as, for example, a Kubernetes® cluster, though other containerized environments are contemplated. In some examples, each component of the storage platform 200 may be running in a separate container that is deployed within the cluster. In some other examples, multiple components of the storage platform 200 may be running in the same container.

Alternatively, clusters 208a, 208b may be an example of cloud resources 118/120/122 where cloud resources 118/120/122 are storage resources. The storage resources may include storage nodes 210a-210f which may including various storage devices which may include, but not be limited to, hard drives, solid state drives, and hybrid drives.

The global scheduler 206 may manage scheduled and on-demand jobs, or tasks, including at least disaster recovery, cross region replication (and replication more generally), and backup jobs. As illustrated, the global scheduler 206 exists within the storage platform 200 but outside of the storage nodes 210a-210f and the storage cluster 208a, 208b. By residing outside of the storage nodes, the global scheduler 206 has a holistic (i.e., global) view of the system and the resources available including on each storage node 210a-201f and the clusters 208a, 208b.

The global scheduler 206 may receive a job request (e.g., create, delete, and/or modify a job) from the CVS 204. In some examples, the job may be a cross region replication of a volume from a first storage node (e.g., node 208a) in a first storage cluster (e.g., cluster 208a) in a first region to a second storage node (e.g., node 208e) in a second storage cluster (e.g., cluster 208b) in a second region. In some yet further alternative examples, cluster 208a and cluster 208b may be in the same region. In some examples, the cross region replication may be based on SnapMirror, a disaster recovery technology, designed for failover from primary storage to secondary storage at a geographically remote site. Cross region replication may be between different regions (e.g., Azure regions). Region pairs themselves may be connected through a global backbone network (e.g., global VNet peering). The global scheduler 206 may store the job request to be run later. The global scheduler 206 may periodically poll the scheduled jobs to build a queue of jobs to perform. The jobs are then pulled from the queue by the global scheduler 206 which determines whether there are sufficient resources to run the job. As an example, this determination may be based on the number of available SnapMirror sessions and available bandwidth on the source storage node (210a in this example) and the destination storage node (210e in this example). If there are sufficient resources to run the job, the global scheduler 206 may schedule the job and send a message to the source node and destination node to perform the job.

The global scheduler 206 may be responsible for the lifecycle management of all the replication jobs and maintain a holistic view of all these jobs across the clusters 208a, 208b. This includes being able to prioritize based on schedules, manage bandwidth for on-demand initialize jobs, and allow preemption. To accomplish this, the global scheduler 206 keeps track of every SnapMirror session available and in use on each of the nodes 210a-210f. This enables the global scheduler 206 to efficiently manage the limited number of sessions of each node 210a-210f and on all clusters 208a, 208b. Overall, the global scheduler 206 may provide new services that prior approaches have been unable to provide due to system and/or geographic limitations.

For example, priority scheduling enables lower priority running jobs to be cooperatively preempted by a higher priority scheduled job so as to keep both jobs within the limit of their respective threshold. The global scheduler 206 may intelligently manipulate the network bandwidth of running jobs so as to efficiently manage various dynamic schedules. For instance, increasing the network bandwidth of a running job will cause it to complete sooner, thereby allowing a job waiting for a free session to start according to a desired schedule.

These benefits are obtained by the structure and operation of global scheduler 206. The global scheduler 206 may be set up with multiple logical components to achieve the different functions. This includes a global scheduler replication API server, which serves as an API endpoint for global scheduler replication calls. This also includes a global scheduler database cluster, which keeps track of the schedules, job status, job history for replication and backup. This further includes a global scheduler dispatcher which queries the DB and builds a job pipeline, then publishes jobs to the scheduled backup/replication task queue, or on-demand queue. This further includes global scheduler task priority queues (e.g., one or more), which are queues for on-demand initialize tasks and replication tasks that are ready to be picked up by the global scheduler core/job processor. The logical components may also include a global scheduler core/job processor, which consumes and prepares the jobs in the replication task queue, and on-demand queue to be run on a storage node; prior to running the task, the global scheduler core/job processor may request a SnapMirror session slot and bandwidth be allocated from the session manager. This may further include a global scheduler session manager which maintains a list of free and in-use SnapMirror sessions for each storage node 210a-210f, responsible for fulfilling session requests from global scheduler core and return session slots and bandwidth for use. This may further include a global scheduler monitoring service that periodically queries the job status from all ONTAP nodes and updates session manager and GS database with job details thus obtained, and a global scheduler supervisor service that keeps metadata in sync, such as node, host, etc., between the CVS 204 and the global scheduler 206, and is responsible for handling all requests for updating customer and global configuration parameters. The syncing may be accomplished through the CVI tables 212. In some examples, each of these components may be implemented as a separate service as described below in FIG. 3.

The global scheduler 206 interacts with a storage operating system of the nodes 210a-210f. In some examples, the communication may be through REST API endpoints. The global scheduler 206 may determine scheduling and may inform the REST API endpoints to implement the scheduled activity. The global scheduler 206 adds intelligence to the scheduling process, including bandwidth adjustment, bandwidth calculation, preemption, priority scheduling, customer fairness, and flexibility in configuration. The intelligence informs the global scheduler 206 when to perform different actions, including determining how to prioritize competing jobs. For example, if there are two priority jobs with thresholds set for each priority, the global scheduler 206 may preempt the lower priority job and cause the higher priority job to run. As another example, when there are jobs in a given queue pending while no sessions available (e.g., no SnapMirror sessions) for that given queue, but sessions available from another queue, the global scheduler 206 may borrow sessions from that queue(s) to implement the pending jobs in the given queue. Prior approaches that relied upon storage operating systems for scheduling simply provided the available sessions for use. The global scheduler 206 adds a layer of priorities to provide configurability in how the available sessions are used, not just at a given node but across clusters and regions.

The global scheduler 206 operates on volumes once they have been placed on one or more of storage nodes 210a-210f. The customer selects a schedule, and the global scheduler 206 keeps jobs running according to the selected schedule. The global scheduler 206 periodically scans to determine if there are any new jobs to be run. For those new jobs that are discovered, the global scheduler 206 places them into different priority buckets (the different queues) based on their characteristics. Job characteristics may include, for example, priority, bandwidth requirement, type, frequency, duration, etc. The global scheduler 206 looks at the queues to determine if there are any jobs pending to be run and does so based on the intelligence added as noted above. The global scheduler 206 picks up those jobs that are ready to be run and checks with the session manager for cross region replication relationships to perform the jobs.

Once a job starts, the global scheduler 206 monitors the lifecycle of the job. This may include confirming that a transfer is complete, detecting whether a failure has occurred that would require a replay or a recovery, etc. The monitoring may include polling the storage operating systems at the endpoints of a relationship to determine status after a job has initiated. This may further include the global scheduler 206 periodically updating the status of one or more jobs in a database.

The ability to manage and utilize available sessions, priority scheduling, intelligently preempt lower-priority jobs as well as manipulate the network bandwidth of running jobs may enable the global scheduler 206, in a best effort manner, to balance resources with the intent for the supported services (e.g., cross region replication, disaster recovery, etc.) to achieve the customer's objectives.

Figure 3:
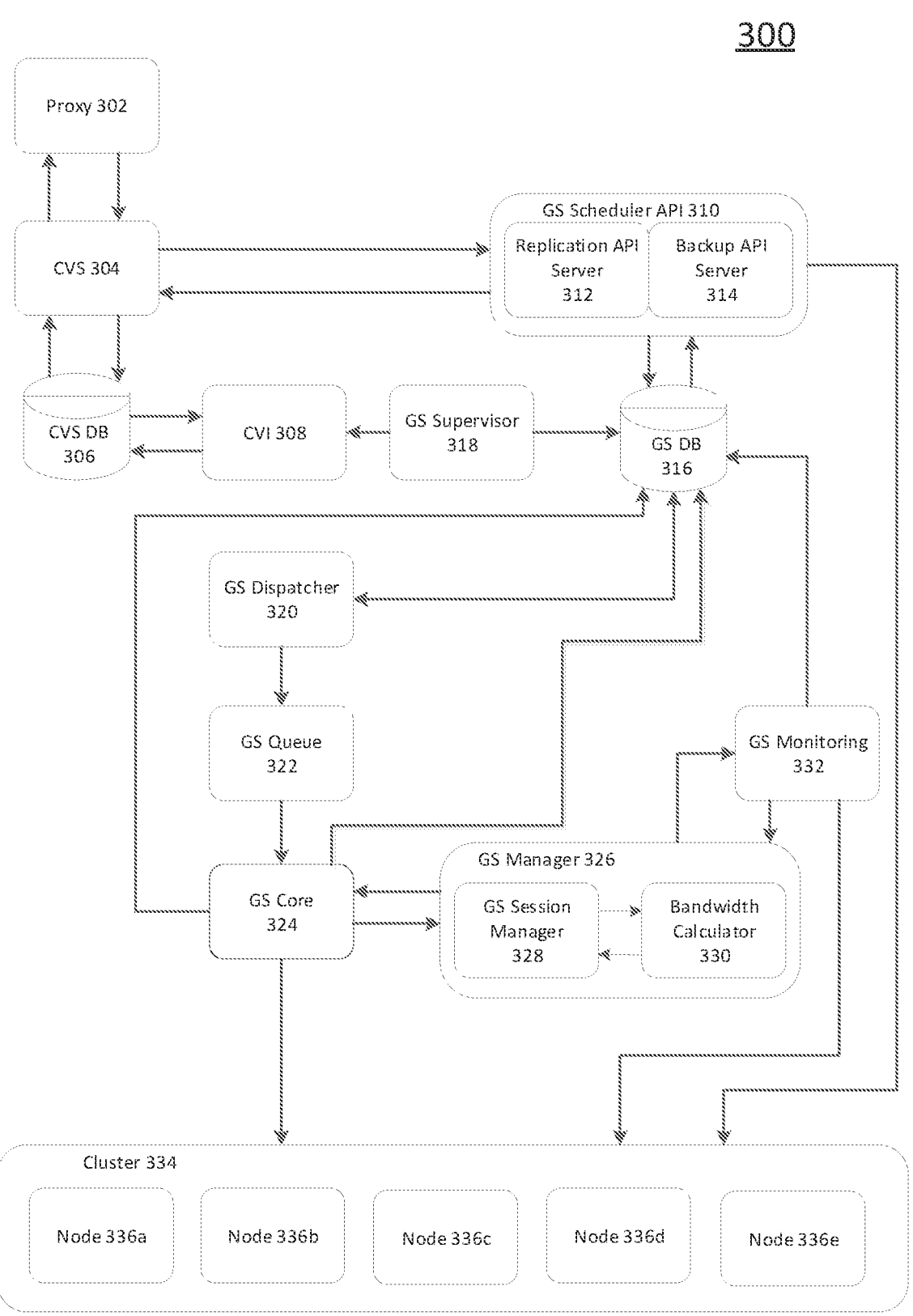
FIG. 3 illustrates a storage platform architecture including independent services of a global scheduler according to some embodiments of the present disclosure.

Turning now to FIG. 3, details of a storage platform 300 are illustrated according to embodiments of the present disclosure. The storage platform 300 may be an example of the storage platform 200 discussed above in FIG. 2. The storage platform 300 illustrates the global scheduler as a multiple individual services working together to perform the functions of the global scheduler. Separating the functions of the global scheduler into multiple services allows the global scheduler to be more easily extensible. As introduced in FIG. 1, the storage platform 300 may be a back-end storage service for the cloud system 106. The cloud system 106 may communicate with the storage platform 300 through a proxy 302. Proxy 302 may be an example of proxy 110 or proxy 202 illustrated in FIGS. 1 and 2. Generally, the proxy 302 may provide one or more APIs for the cloud system 106 to communicate with global scheduler 306 of the storage platform 300. The proxy 302 may communicate with a cloud volume service (CVS) 304. The CVS 304 may store information in a CVS database 306. A cloud volume infrastructure API server (CVI) 308 may be an example of the CVI 212 described above in FIG. 2.

The global scheduler 206 as described in FIG. 2 may further include multiple independent services working in cooperation to perform the function of the global scheduler. As illustrated in FIG. 3, there are a global scheduler (GS) scheduler API 310, including a replication API server 312 and a backup API server 314; a GS database 316; a GS supervisor 318; a GS dispatcher 320; a GS queue 322; a GS core 324; a GS manager 326 including a GS session manager 328 and a bandwidth calculator 330; and a GS monitoring service 332. These services combined may be collectively referred to as the global scheduler. Each of these services may be running in a containerized environment, such as, for example, a Kubernetes® cluster, though other containerized environments are contemplated. In some examples, each service of the storage platform 300 may be running in a separate container that is deployed within a cluster. In some other examples, multiple components of the storage platform 300 may be running in the same container.

This logical structure provides several benefits such as the inter-operation of the components allows for more functions, and flexibility, to be achieved. The separation of the services to different components that interact together makes the system overall more manageable and more easily extendable (e.g., starting with providing replication service, then expanding to backups and other types of scheduling, such as rekey and other schedule-based services).

The global scheduler, including these cooperating components, communicates with a cluster 334. The cluster 334 may be an example of clusters 208a and 208b described above with respect to FIG. 2. While a single cluster, cluster

334, is illustrated for simplicity of discussion, there may be more than one cluster. Each cluster represented by cluster 334 may be in the same region or may be in different regions. Cluster 334 may include one or more storage nodes 336. As illustrated in FIG. 3, cluster 334 includes storage nodes 336a, 336b, 336c, 336d, and 336e.

As previously discussed, customers 104, 105 communicate with the storage platform 300 through proxy 302. Proxy 302 provides an interface between customers 104, 105 and CVS 304. CVS 304 may provide an API for requesting replication of volumes stored on storage nodes 336a-336e. CVS 304 may also provide an API for requesting replication of volumes, backups of volumes, and performing other operations within storage platform 300 that may be scheduled and run by the global scheduler. As an example, CVS 304 may provide an API for creating replication relationships for volumes stored in cluster 334 on one of the nodes 336a-336b. The replication relationship may be stored in the CVS database 306. The CVS database 306 may maintain, among other information, jobs created by customers 104, 105. The jobs may be volume replication, volume backup, node rekey, and/or other jobs. The CVI 308 may communicate with the CVS 304, and more specifically with the CVS database 308, to provide additional information to the global scheduler, as will be discussed further below.

The CVS 304 may communicate with the GS scheduler API 310 to create a scheduled job. The GS scheduler API 310 may include one or more different API servers to handle the different requests from the CVS 304. For example, the replication API server 312 may provide an endpoint for volume replication requests. The requests received by the replication API server 312 may be stored in the GS database 316 along with pertinent scheduling information such as, for example, frequency and priority. As another example, the backup API server 314 may provide an endpoint for volume backup requests. The volume backup requests received by the backup API server 314 may also be stored in the GS database 316 and include pertinent scheduling information for volume backups. Although only two servers are illustrated, other API servers to handle other request types (e.g., encryption rekey) are contemplated for use with the global scheduler. The GS scheduler API 310 may communicate with the cluster 334, and more specifically with one of the nodes 336a-336e within the cluster 334. In some examples, the GS scheduler API 310 may query volume details from the node 336a-336e on which the volume is stored. These details may then be stored in the GS database 316. The data stored in the GS database 316 may be used as a persistent backup if any of the global scheduler services restart.

The GS database 316 may run on a SQL database, such as for example, MySQL, Oracle SQL, PostgreSQL, etc. In other examples, the database 316 may run a NoSQL database, such as for example, MongoDB, DynamoDB, etc. The GS database 316 may store, among other information, job schedules, job status, and job history. This information may be used to achieve the targeted customer fairness by tracking the history and status of jobs to ensure that each customer is receiving the contracted level of service. For example, a lower priority job may not run as scheduled because it is lower priority than other jobs, there are not enough resources to run the lower priority job, the lower priority job is preempted, just to name a few examples. The GS database 316 may store a record of each time that the lower priority job is skipped or otherwise is not run as scheduled. These records may be used to ensure that the lower priority job runs at least once over a predetermined period of time (e.g., 10 minutes, 1 hour, 1 day, etc.) regardless of the priority of the lower priority job. If it is determined that the lower priority job has not run for the given period of time, or threshold period of time, then the job may be scheduled before a higher priority job. This promotes customer fairness and ensures that each customer is receiving the contracted level of service.

The GS supervisor 318 may keep metadata in sync between the CVS database 306 and the GS database 316. The metadata may include node, host, and storage virtual machine details, including, for example, source, location, bandwidth, number of sessions (e.g., SnapMirror), etc. The GS supervisor 318 may also handle requests for updating customer and global configuration parameters including, for example, maximum number of sessions available for each job type, percentage of sessions used for each job type, schedule session thresholds, bandwidth, etc. Session thresholds may define a minimum number of sessions that must be available for each job type. The GS supervisor 318 may periodically poll data from the CVI 308 to update the GS database 316. In some examples, the GS supervisor 318 may poll the CVI 308 based on a schedule. In some other examples, the GS supervisor 318 may poll the CVI 308 based on a trigger, such as for example, the creation of a new volume by the CVS 304. The GS supervisor 318 may populate the host, SVM, and node (and/or other) details in the GS database 316 before a job is triggered.

The GS dispatcher 320 may query the GS database 316 for eligible jobs and creating a pipeline for each type of job for each node 336a-336e. For example, the GS dispatcher 320 may create a first pipeline, or series of jobs, for replication jobs and a second pipeline for backup jobs. The GS dispatcher may then publish the job pipelines to the GS queues 322. Each job pipeline may be published to its own queue in the GS queues 322. For example, the replication job pipeline may be published to the replication job queue and the backup job pipeline may be published to the backup job queue. Other job queues may be created for different types of scheduled jobs. In other examples, some jobs may be published to the same queue, such that a given queue may have one or more job types (and/or multiple nodes), with multiple queues in total, while in other examples each job type may have its own queue.

On startup, the GS dispatcher 320 may scan the GS database 316 for scheduled backup jobs and replication jobs. In some embodiments, the GS dispatcher 320 may store the metadata for the jobs in its own local storage, such as, for example, a job metadata cache. After startup, the GS dispatcher 320 may periodically rescan the GS database 316 and update its job metadata cache. Maintaining a local, cached copy of the scheduled jobs may improve the speed of the GS dispatcher 320 by removing potentially costly communication with the GS database 316. The GS dispatcher 320 may use the metadata stored in its job metadata cache to build the job pipelines. In building the pipelines, the GS dispatcher 320 may determine the priority of each job based at least in part on the schedule (e.g., hourly, daily, etc.) and the lag time of the job (e.g., how far behind schedule the job is currently). In some embodiments, the GS dispatcher 320 may build a separate pipeline for each node 336a-336e. After building the job pipelines, the GS dispatcher 320 may determine whether each pipeline can be published. In some embodiments, the determination is made in a round-robin manner based on node. In some other embodiments, the determination is made in a round-robin manner based on job type.

The GS queues 322 maintain job queues of the job pipelines created by the GS dispatcher 320. The job queues may include scheduled backup jobs, volume replication jobs, and on-demand backup jobs (to name a few examples). The job queues stored by GS queues 322 may be ready to be processed upon request by another service, such as for example, the GS core 324 service. In some embodiments, the job queues stored in the GS queues 322 may be implemented using RabbitMQ. In some embodiments, the job queues stored in the GS queues 322 may be shared with other services in the cluster. In some other embodiments, each service within the cluster, including GS queues 322, may have their own job queues. In some examples, the other services may not be part of the global scheduler services.

The GS core 324 may select and prepare the individual jobs that are stored by the job queues of the GS queues 322. These jobs include jobs stored in the scheduled backup job queue, the volume replication job queue, and the on-demand job queue, among others (where there are more). The GS core 324 may follow a process of de-queueing a job, determining whether there are sufficient resources to run the job, and running the job. To begin the dequeue process, the GS core 324 may receive a message from the GS queues 322, specifically from a job queue such as the volume replication queue within the GS queues 322. The GS core 324 may then determine whether the job may be run on the node 336a-336e. Determining whether the job may be run may include determining whether there are sufficient sessions on the node 336a-336e, identified by the job, to run the job. If the job is ready to be run on the node 336a-336e, the GS core 324 may take ownership of the job and send an acknowledge message to the GS queues 322 to remove the message from the queue. Alternatively, if the job cannot be run on node 336a-336e, the job may be marked for a later cycle and an acknowledge message sent to the GS queues 322 to remove the message from the queue. In such a case, the GS dispatcher 320 may, at a future time, re-publish the job to ensure that the job is scheduled fairly. A lag time is calculated for the job that is removed where the lag time is the difference between the current time and the scheduled time. The lag time is then compared to a threshold time period to determine when the job cannot be rescheduled and must be run. This threshold time period may be measured in minutes, hours, or days. The job may be skipped again when the lag time is less than the threshold period of time. The job is not skipped when the lag time is greater than the threshold period of time. Tracking the lag time ensures that the jobs are scheduled fairly. Alternatively, the GS core 324 may use job preemption and network bandwidth adjustments to run a job instead of marking the job for a later cycle.

For example, if there are insufficient sessions to run the current job, the GS core 324 may determine if it is possible to preempt a lower priority running job. Job preemption may be limited to occur in situations where the job count is more than a minimum threshold for that job type. To identify an optimal candidate for a preemption, the GS core 324 may scan from the lowest priority running job to that with a priority level closest to, but less than, the dequeued (not yet running) job. If a candidate is found, the GS core 324 may pause that candidate (running) job and run the dequeued job in its place. In some alternative examples, a lower priority job may preempt a higher priority if it the higher priority job is underutilizing its resources. Where a preemption candidate is unavailable, the GS core 324 may attempt to adjust the network bandwidth of running jobs to make them complete sooner, as described next.

If the dequeued job is a high priority job and a preemption candidate is not available, the GS core 324 may try to adjust the bandwidth of running jobs to make a selected job complete sooner so as to release and make available the sessions of the selected job earlier. This is done by reducing the bandwidth of one job and transferring that bandwidth to the selected, running job that the GS core 324 has determined to complete sooner. To identify the candidate jobs to increase and decrease the bandwidth, the GS core 324 may consider the running duration of the job, the transferred size of the job, the total transfer size of the job, average completion time of the job based on historic data, and/or the current transfer rate of the job, among other parameters. In some examples, user-initiated jobs (e.g., backup, restore, etc.) may be serviced at the highest priority.

GS core 324 may use a type attribute associated with a job to distinguish the various job types available. Based on the job type the GS core 324 may spawn a corresponding worker (e.g., process, thread, etc.) for the job. Some examples of workers are ad-hoc workers, scheduled workers, restore workers, and replication workers. The ad-hoc workers may run on-demand backup jobs. The scheduled workers may run backup jobs that are scheduled. The restore workers may run on-demand restore jobs for a backup. The replication worker may run a replication job.

The GS manager 326 may include the GS session manager 328 and the bandwidth calculator 330. On startup, the GS session manager 328 may read job information from the GS database 316 to build an initial job status session cache. Subsequently, this cache may be updated by messages from the GS monitoring service 332.

The GS session manager 328 may maintain a list of free and in-use sessions for each node 336a-336e of the cluster 334. In some examples, the sessions may be SnapMirror sessions. Once peering has been established between the source and a destination, the CVS 304 may create a SnapMirror relationship (following this example) for source and destination volumes. After the relationship has been created, volume replication jobs may be triggered. In order to run a volume replication job, both source and destination nodes 336a-336e may have their session availability count decreased by one because both nodes have allocated a session to run the volume replication job. A single node from among nodes 336a-336e may support a limited number of active sessions at any point in time. In some embodiments, the number of active sessions may be based on the number of hosted volumes. For example, a node that hosts 1000 volumes may be limited to 100 active sessions at any point in time (as just one numeric example). This limit may ensure that the core data access duties of the storage platform 300 are not interrupted by the GS core 324 running jobs.

The GS session manager 328 may use configurable parameters such as sessions per node, preemption enabled, and session manager rules, among others. For example, preemption may be disabled by a user. As another example, the GS session manager 328 may maintain a maximum number of sessions (e.g., SnapMirror sessions) per node 336a-336e. While a maximum of about 100 sessions is given for sake of illustration, the maximum may be higher or lower. In some examples, the maximum number of sessions may be determined based on the total number of volumes stored on the node 336a-336e. For example, the maximum number of active sessions may be set at a percentage of the total number of volumes (e.g., 10%), meaning that if 1000 volumes are stored on the node 336a, then the node 336a may have 100 active sessions at any one time. This ensures that the core data transfer requirements of the storage platform 300 may be met.

The GS session manager 328 may have predefined rules for session assignment, and may be at varying levels such as some at the global level as well as some at the customer level. These rules may be refreshed in the cache in case of any update operation. In some embodiments, the rules may correspond to the requirements of the jobs. For example, volume replication job rules may include a maximum number of initialize jobs running simultaneously at a global level, a maximum number of concurrent ad-hoc replication jobs at the customer level, and/or a maximum number of concurrent scheduled replication jobs at the customer level. As another example, backup job rules may include a maximum number of manual backup jobs per day at a customer level, a maximum number of restores per day at a customer level, and/or a maximum number of concurrent restore and manual backup jobs at a customer level.

The GS session manager 328 may maintain a fixed number of sessions (including both a free pool and an in use pool) for each node 336a-336e. The sessions may be divided into a free pool and an in-use pool. Sessions in the free pool are available to be assigned while sessions in the in-use pool are currently running a job. The sessions in each pool may be further divided into an initialize pool and an update pool. The sessions in the initialize pool may be used for an initial job (e.g., replication, backup, etc.) that may transfer larger amounts of data and take a longer amount of time. The sessions in the update pool may be used for update jobs (e.g., replication, backup, etc.) where incremental changes are recorded, requiring less time and data transfer. The GS session manager 328 may provide an API interface for session assignment, including assignment and release operations. The GS monitoring 332 and the GS core 324 may use the API interface to assign and release sessions and to update the GS session manager 328 of any ongoing job progress. The GS session manager 328 may also maintain the job details associated with each session in use including, for example, percent complete, bandwidth used, and elapsed time. When the GS session manager 328 assigns a session to a node (e.g., node 336a), the GS session manager 328 moves the session from the free pool to the in-use pool for the node (e.g., node 336a). In some examples, bandwidth may be assigned to the node (e.g., 336a) at the same time as the session. When a job is completed, the GS monitoring service 332 may notify the GS session manager 328 to release the session and move it to the free pool.

The GS session manager 328 may further make session assignment determinations based on job information such as for example, priority, job type, job threshold, and job bandwidth, among others. Job types may include, for example, backup initialize, backup update, replication initialize, and replication update. For example, the GS session manager 328 may use a session from the initialize pool for an initialize job and use a session from the update pool for an update job. As another example, the GS session manager 328 may prioritize session assignment based on the scheduled duration of the job. That is, the GS session manager 328 may assign a session to a job estimated or scheduled to complete sooner than another (longer-duration) job, before assigning a session to the longer-duration job. In some examples, the GS session manager 328 may define a minimum threshold, or number, of running jobs for each job type to ensure that the different job types are being run. For example, a group of update jobs may be repeatedly scheduled before a group of scheduled initialize jobs because each of the update jobs has a higher priority than each of the initialize jobs. This may result in the initialize jobs not being run. Setting a minimum threshold of running jobs for each job type ensures that jobs of all job types are able to run in a timely manner. Furthermore, the GS session manager 328 may determine to not preempt a job of a job type because the number of jobs of that type currently running is less than the minimum threshold for that job type. The GS session manager 328 may communicate with the bandwidth calculator 330 to obtain (e.g., reserve) bandwidth for a job. The bandwidth may be provided by the GS session manager 328 to the GS core 324 when the session is assigned.

The bandwidth calculator 330 may keep track of available and used bandwidth for each node 336a-336e. When a job is assigned a session by the GS session manager 328, it may provide the bandwidth allocated together with the session. The allocated bandwidth may be based on configurable parameters, such as for example, total bandwidth and initial window size, among others. In some examples, update type jobs may be configured with unlimited bandwidth so that the nodes 336a-336e can evenly distribute the bandwidth upon availability in order to maximize resource utilization. In some other examples, initialize type jobs may use the bandwidth calculator 330. During startup and initialization, the bandwidth calculator 330 may begin with an initial window size (i.e., the maximum number of jobs that can be serviced at any given time). The window size may be dynamically adjusted later on based on the volume of jobs running and changes to the nodes (e.g., addition, removal, and/or failure of one or more nodes).

The bandwidth calculator 330 may determine bandwidth allocated to a job based on the job details provided by the GS session manager 328. Job details may include, for example, the type of job, the priority of the job, the customer ID, and the node UUID, among others. The amount of available bandwidth, and how much is allocated, may be based on each node 336a-336e individually. Therefore, as bandwidth is assigned to each job, the amount of available bandwidth for that node 336a-336e decreases. When a job completes and the GS session manager 328 releases the session, the bandwidth corresponding to that session is returned to the available bandwidth of the node 336a-336e. In some examples, the total number of jobs running may affect the available bandwidth.

The GS monitoring service 332 may be responsible for updating the job status of each job running under the direction of the global scheduler. To do this, the GS monitoring service 332 may periodically query the job status from all nodes 336a-336e running jobs. The GS monitoring service 332 may then update both the GS session manager 328 and the GS database 316 with the status of each job. During startup, the GS monitoring service 332 may obtain necessary node and host information (e.g., IP address, usernames, passwords, etc.) from the GS DB 316. The GS monitoring service 332 may refresh the data periodically to identify nodes that have been added, removed, and/or are unresponsive.

After initialization, the GS monitoring service 332 may periodically send messages to every node 336a-336e in the cluster 334 to query the status for every job on every node 336a-336e. The GS monitoring service 332 then sends a message to the GS session manager 328 indicating which nodes 336a-336e have a change in their job status. In some examples, this may trigger the GS session manager 328 to query the GS database 316 for any changes to the nodes 336a-336e. The GS monitoring service 332 may, at the same time, write the updated job status to the GS database 316.

Together, these various services interact to provide the functions of the global scheduler. Moreover, as previously noted, providing these services as different aspects that interact together enables the system overall to be more manageable and more easily extendable. The operation of these different services combine together to provide the cross-region and cross-cluster, holistic view into the overall operation of a system that was otherwise not available to schedulers with views limited to just the operating system in which they were located.

Figure 4A:
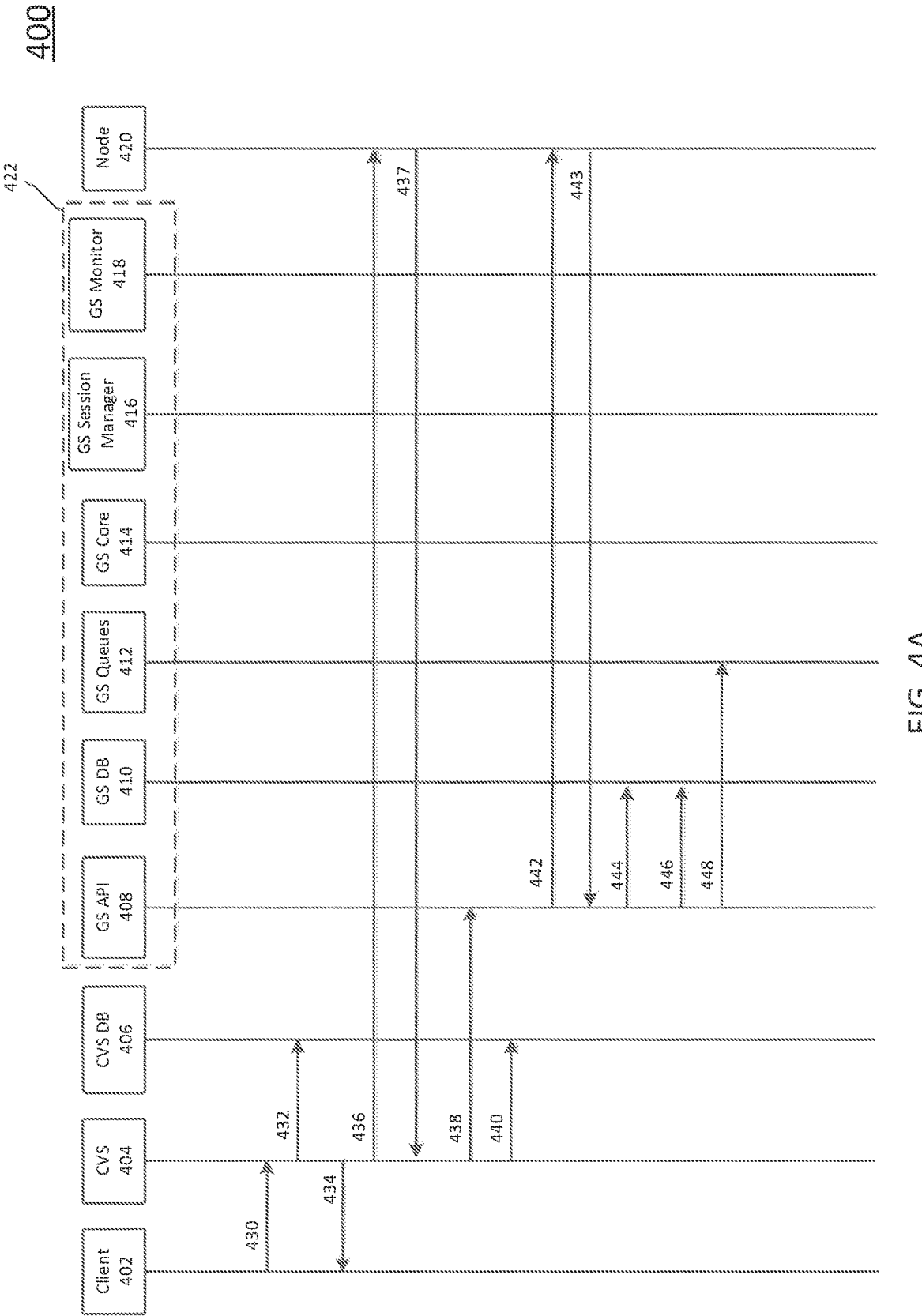
FIGS. 4A and 4B illustrate an exemplary process flow for creating a job that is scheduled to run across one or more storage nodes in one or more storage clusters according to some embodiments of the present disclosure.
Figure 4B:
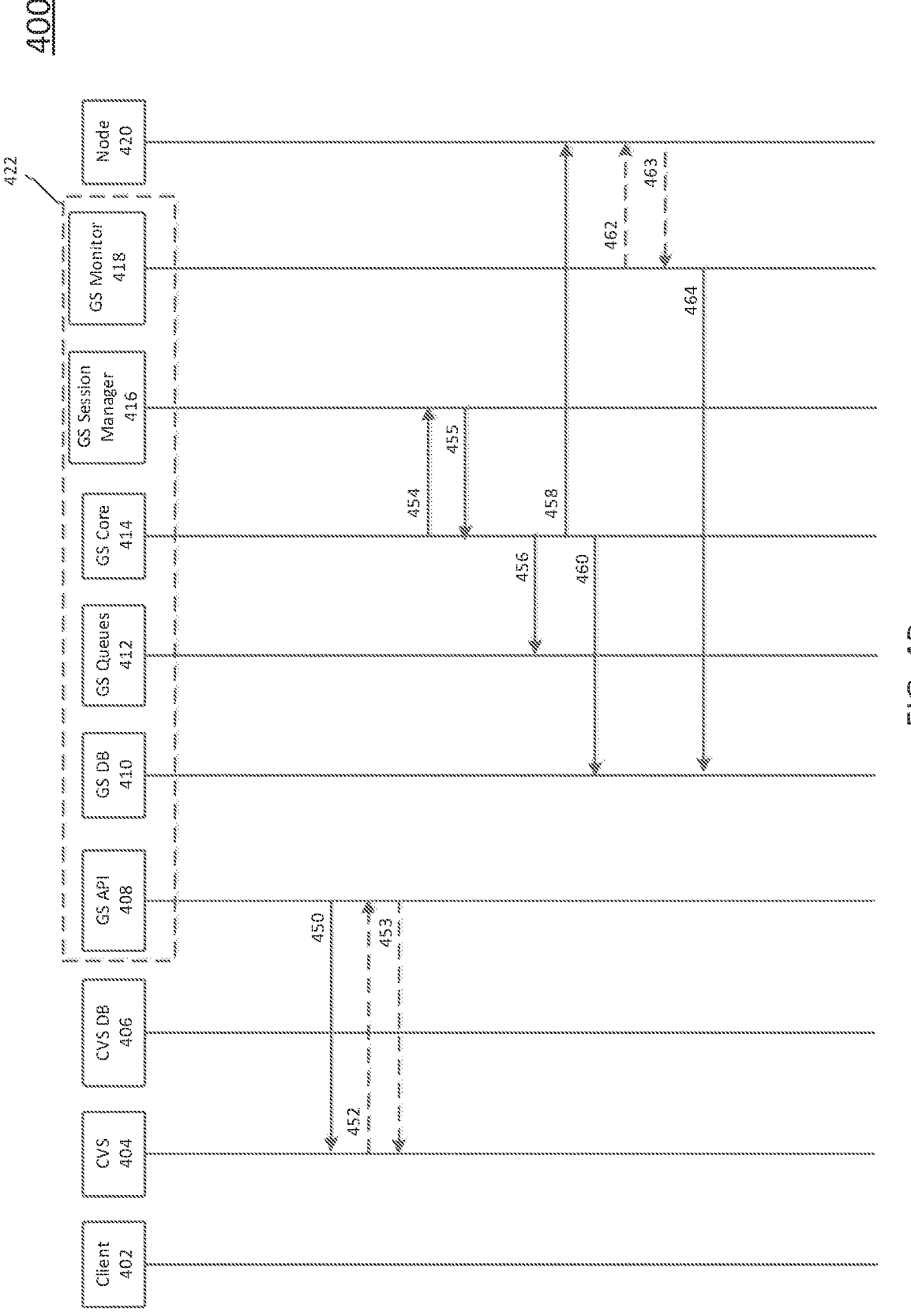

Turning to FIGS. 4A and 4B, illustrated is an exemplary flow for creating a new replication relationship according to some embodiments of the present disclosure. As illustrated in FIGS. 4A and 4B, client 402 may be an example of customer 104, 105 described above with respect to FIG. 1; CVS 404 may be an example of CVS 204 or CVS 304 described above with respect to FIGS. 2 and 3; CVS DB 406 may be an example the CVS database 406 described above with respect to FIG. 3; GS API 408 may be an example of GS scheduler API 310 described above with respect to FIG. 3; GS DB 410 may be an example of GS DB 316 described above with respect to FIG. 3; GS Queues 412 may be an example of GS queues 322 described above with respect to FIG. 3; GS Core 414 may be an example of GS core 322 described above with respect to FIG. 3; GS Session Manager 416 may be an example of GS session manager 328 described above with respect to FIG. 3; GS Monitor 418 may be an example of the GS monitoring service 332 described above with respect to FIG. 3; and Node 420 may be an example of one or more of nodes 336a-336f described above with respect to FIG. 3. Box 422 indicates the individual services that may be considered a part of the global scheduler. As discussed below, the services are separate entities that communicate with one another to act as the global scheduler. However, in some embodiments, the individual services described may be combined to form fewer independent services while still performing the same tasks in a similar manner.

At action 430, the client 402 may send a request to the CVS 404. The request may be handled by a proxy, such as for example proxy 202 described above with respect to FIG. 2. In some examples, the request may be a create volume replication request. In other examples, the request may be a backup request, a cryptographic rekey request, or another scheduled task. The discussion below will use the example of a create volume replication request for ease of discussion.

At action 432, the CVS 404 creates a volume replication job in the CVS DB 406.

At action 434, the CVS 404 responds to the Client 402 acknowledging that the request was received and stored.

At action 436, the CVS 404 sends a message to the node 420 to set up a volume replication relationship. In this example, the node 420 may be the source node. The volume replication relationship may have an empty scheduler when first created. In order to set up the volume replication relationship, the CVS 404 may ensure that peering already exists between a source storage node (e.g., Node 336a) and a destination storage node (e.g., Node 336b). The CVS 404 may create the peering between the source storage node 336a and the destination storage node 336b if one does not already exist. The CVS 404 may query destinations and other information from the node 420, check if creation is possible, and/or issue relationship creation calls to the node 420, among other tasks.

At action 437, the node 420 responds to the query from CVS 404. In some examples, the response may include information about the destination of the peering. In some other examples, the response may provide an indication of whether a volume replication relationship may be formed.

At action 438, the CVS 404 sends a create volume replication request to the global scheduler API 408 in order to notify the global scheduler of the new volume replication.

At action 440, the CVS 404 updates the volume replication job status to "completed" in the CVS DB 406 in response to successfully creating the volume replication request. In some examples, the GS API 408 may respond to the create volume replication of action 438 request indicating the successful creation of the volume replication.

At action 442, the GS API 408 queries the Node 420 for volume details about the volume that is being replicated in response to the create volume replication request received from the CVS 404 at action 438.

At action 443, the node 420 responds to the queries from GS API 408. In some examples, the response may include the size of the volume, the format of the volume, the destination of the replication, etc.

At action 444, the GS API 408 creates a scheduled replication record in the GS DB 410 for the volume stored on the Node 420. The replication record may identify the volume to be replicated, the source node (e.g., Node 420), and the destination node (e.g., node 3360). In some embodiments, the scheduled replication is disabled initially.

At action 446, the GS API 408 creates an initialize job in the GS DB 410. In some embodiments, the initialize job may be a SnapMirror job. The initialize job may be the first replication of a volume, where the entire volume is replicated from the source storage node 336a to the destination storage node 336b.

At action 448, the GS API 408 publishes the initialize job to the GS Queues 412. Publishing a job to the GS Queue 412 may include providing job information so that the GS Core 414 can prepare the job to be run by the Node 420. Job information may include the volume to replicate, the source node, the destination node, bandwidth, etc. The GS Queues 412 may store the job information in a local cache for fast retrieval. Publishing the job to the GS Queues 412 may allow the initialize job to be prepared and run at the scheduled time.

At action 450, the GS API 408 sends a create volume replication response to the CVS 404, in response to the job being published to the GS Queues 412. The create volume replication response acknowledges the successful creation of the volume replication job.

At action 452, the CVS 404 periodically polls the volume replication status from the GS API 408. In some examples, the GS API 408 may request the volume replication status from the GS DB 410. The CVS 404 then may update the record in the CVS DB 406 based on the response received from the GS API 408 at action 453. In some examples, the create volume replication status may be periodically sent to the Client 402.

At action 454, the GS Core 414 sends a message to the GS Session Manager 416 to determine whether any sessions (e.g., SnapMirror) are available to run the created volume replication job. While illustrated as occurring after the prior actions, this may occur periodically and independent of the create volume replication request. In some examples, the GS Core 414 may send the message at regular intervals of about 1 minute to about 10 minutes. In some examples, the GS Core 414 may send the message in response to a determination that its available session information is stale.

At action 455, the GS Session Manager 416 responds to the request from the GS Core 414. In some examples, the response may include the number of available sessions. In some other examples, the response may indicate that there are available sessions without providing a number of available sessions.

At action 456, if the GS Session Manager 416 identifies an available session, the GS Core 414 sends a run job message to the GS Queues 412. The GS Session Manager 416 may identify available sessions from the locally stored cache of session information. For example, the GS Session Manager 416 may identify an available session from the free pool of sessions for the Node 420. In some examples, the available session may be from the initialize pool of session of the Node 420.

At action 458, the GS Core 414 sends instructions to run the initialize replication on the Node 420. In some embodiments, the replication may be a SnapMirror replication that is executed on the Node 420. The Node 420 (e.g., source storage node 336*a*, destination storage node 336*b*) then runs the replication job as instructed by the GS Core 414.

At action 460, the GS Core 414 marks the job as "In Progress" in the GS DB 410. The GS Core 414 maintains a current status of running jobs in the GS DB 410. In some examples, the CVS 404 may request the status of running jobs through the GS API 408, such as by the periodic queries illustrated by action 452 as discussed above.

At action 462, the GS Monitor 418 polls the Node 420 for the replication relationship status. The GS Monitor 418 monitors the status of the different jobs running on the storage nodes (e.g., nodes 336*a*-336*e*). The GS Monitor 418 may poll the Node 420 at regular intervals of about 0.1 second to about 10 seconds depending on the job type.

At action 463, the node 420 sends a response to the GS Monitor 418 with information about the replication relationship status. The replication relationship status may include information about whether the relationship is broken, synchronized, or released.

At action 464, the GS Monitor 418 updates the corresponding job status in the GS DB 410 based on the status information received from the response at action 463. Again, as the polling at action 462 may be periodic, the corresponding updates may occur after each polling result.

Figure 5A:
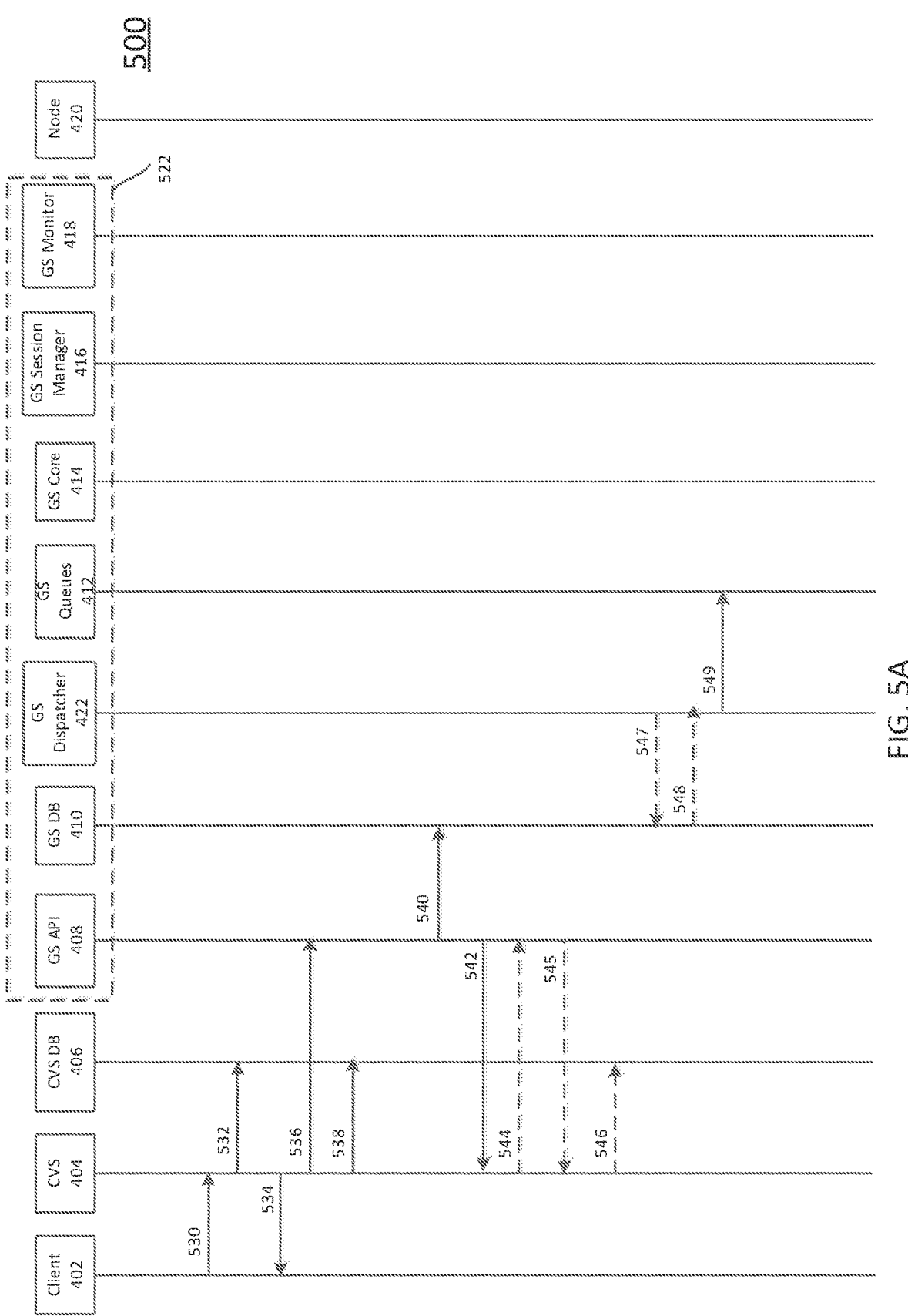
FIGS. 5A and 5B illustrate an exemplary process flow updating a job that is scheduled to run across one or more storage nodes in one or more storage clusters according to some embodiments of the present disclosure.
Figure 5B:
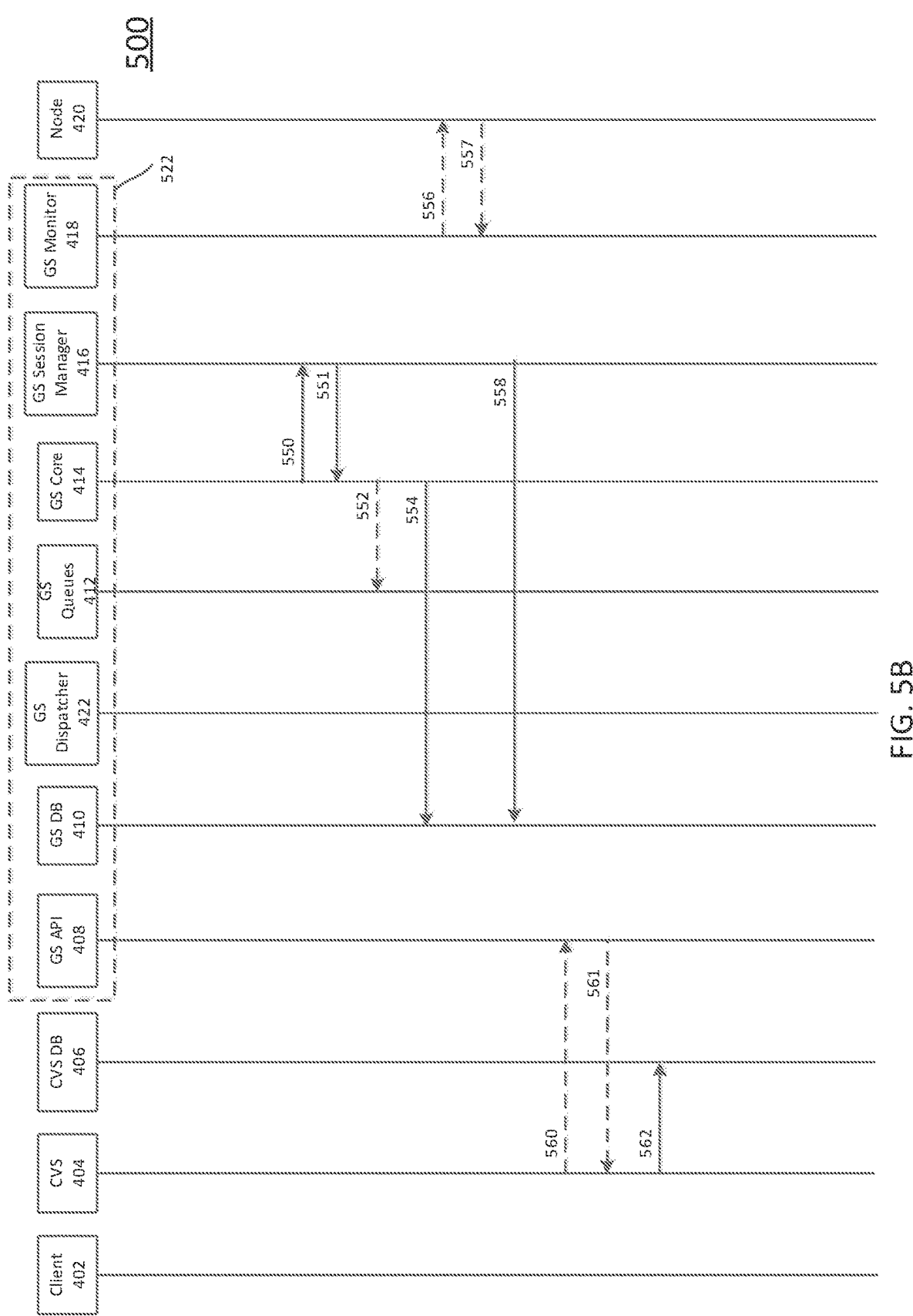

Turning to FIGS. 5A and 5B, illustrated is an exemplary flow for updating a scheduled job according to some embodiments of the present disclosure. As illustrated in FIGS. 5A and 5B, client 402 may be an example of customer 104, 105 described above with respect to FIG. 1; CVS 404 may be an example of CVS 204 or CVS 304 described above with respect to FIGS. 2 and 3; CVS DB 406 may be an example the CVS database 406 described above with respect to FIG. 3; GS API 408 may be an example of GS scheduler API 310 described above with respect to FIG. 3; GS DB 410 may be an example of GS DB 316 described above with respect to FIG. 3; GS Dispatcher 422 may be an example of GS Dispatcher 320 described above with respect to FIG. 3; GS Queues 412 may be an example of GS queues 322 described above with respect to FIG. 3; GS Core 414 may be an example of GS core 322 described above with respect to FIG. 3; GS Session Manager 416 may be an example of GS session manager 328 described above with respect to FIG. 3; GS Monitor 418 may be an example of the GS monitoring service 332 described above with respect to FIG. 3; and Node 420 may be an example of nodes 336*a*-336*b* described above with respect to FIG. 3. Box 522 indicates the individual services that may be considered a part of the global scheduler. As discussed below, the services are separate entities that communicate with one another to act as the global scheduler. However, in some embodiments, the individual services described may be combined to form fewer independent services while still performing the same tasks in a similar manner.

At action 530, the client 402 issues a request to the CVS 404. In some examples, the request may be an asynchronous update volume replication request. In some other examples, the request may be a request to update another scheduled job such as volume backup and cryptographic rekey, among others. The discussion below will use the update volume replication request for sake of simplicity in discussion.

At action 532, the CVS 404 creates an update volume replication job in the CVS DB 406. The different jobs may be stored in the CVS DB 406. The CVS DB 406 may be periodically synchronized with the GS DB 410, such as at action 560, to provide the Client 402 with updated status information.

At action 534, the CVS 404 responds to the Client 402 before sending the update volume replication request. The response may include a response code indicating that the request was accepted. Where the request was not accepted, the response may include an error code. An error may occur if the update volume replication job request is not formed properly.

At action 536, the CVS 404 sends an update volume replication request to the GS API 408 to notify the global scheduler of the updated volume replication schedule and/or volume replication name.

At action 538, the CVS 404 sets the job status to "Completed" in the CVS DB 406 in response to the request to update the volume replication job being sent to the GS API 408.

At action 540, the GS API 408 updates the scheduled replication record in the GS DB 410 in response to the request to update the volume replication job at action 536. In some examples, the GS Replication API 408 may handle the replication update request.

At action 542, the GS API 408 responds to the global scheduler update volume replication request.

At action 544, the CVS 404 periodically queries the volume replication status from the GS API 408. The GS API 408 may query the volume replication status from the GS DB 410.

At action 545, the GS API 408 responds to the CVS 404 with the volume replication status.

At action 546, the CVS 404 may update the volume replication status in the CVS DB 406 based on the information received in the response at action 545.

At action 547, the GS Dispatcher 422 periodically polls the GS DB 410 for jobs. The jobs may be different job types. In some examples, each job may include a priority.

At action 548, the GS DB 410 responds to the GS Dispatcher 422 with a list of jobs. In some examples, there may not be any jobs and the GS DB 410 response indicates that there are no jobs.

At action 549, the GS Dispatcher 422 publishes the selected jobs to the GS Queues 412. Once the jobs are published to the GS Queues 412, they are eligible to be run on Node 420.

At action 550, the GS Core 414 checks with the GS Session Manager 416 to see if sessions are available to run the job. In some embodiments, the sessions may be SnapMirror sessions.

At action 551, the GS Session Manager 416 responds to the GS Core 414. In some examples, the GS Session Manager 416 provides a number of sessions available. In some other examples, the GS Session Manager 416 indicates that there are available sessions without providing a number of sessions.

At action 552, the GS Core 414 selects the job from the GS Queues 412. The GS Core 414 may select the type of job from GS Queues 412 based on the sessions available as reported by GS Session Manager 416 at action 551. In some examples, there may be more than one job to select from. In some examples, there may be more than one job type to select from. In some examples, there may be no available sessions and GS Core 414 will not select a job.

At action 554, the GS Core 414 marks the job as "In Progress" in the GS DB 410.

At action 556, the GS Monitoring 416 polls Node 420 for the replication relationship status. In some embodiments, the replication relationship may be a SnapMirror relationship.

At action 557, the Node 420 responds to the GS Monitoring 416 with the replication relationship status.

At action 558, the GS Session Manager 416 updates the corresponding job status in the GS DB 410. The replication relationship status received at action 557 is stored in GS DB 410 along with the job status. Actions 546-558 may be performed periodically to dispatch eligible jobs by the GS Core 414 to be run on the Node 420.

At action 560, the CVS 404 periodically queries job status via the GS API 408. For example, the GS API 408 may query the GS DB 410 for the job status at regular intervals of about 10 seconds to about 5 minutes.

At action 561, the GS API 408 responds to the CVS 404 with the requested job status.

At action 562, the CVS 404 updates the corresponding job status in the CVS DB 406 in response receiving job status information from the GS API 408 in action 561.

Actions 560-562 may be performed periodically to synchronize the CVS DB 406 and the GS DB 410.

Figure 6:
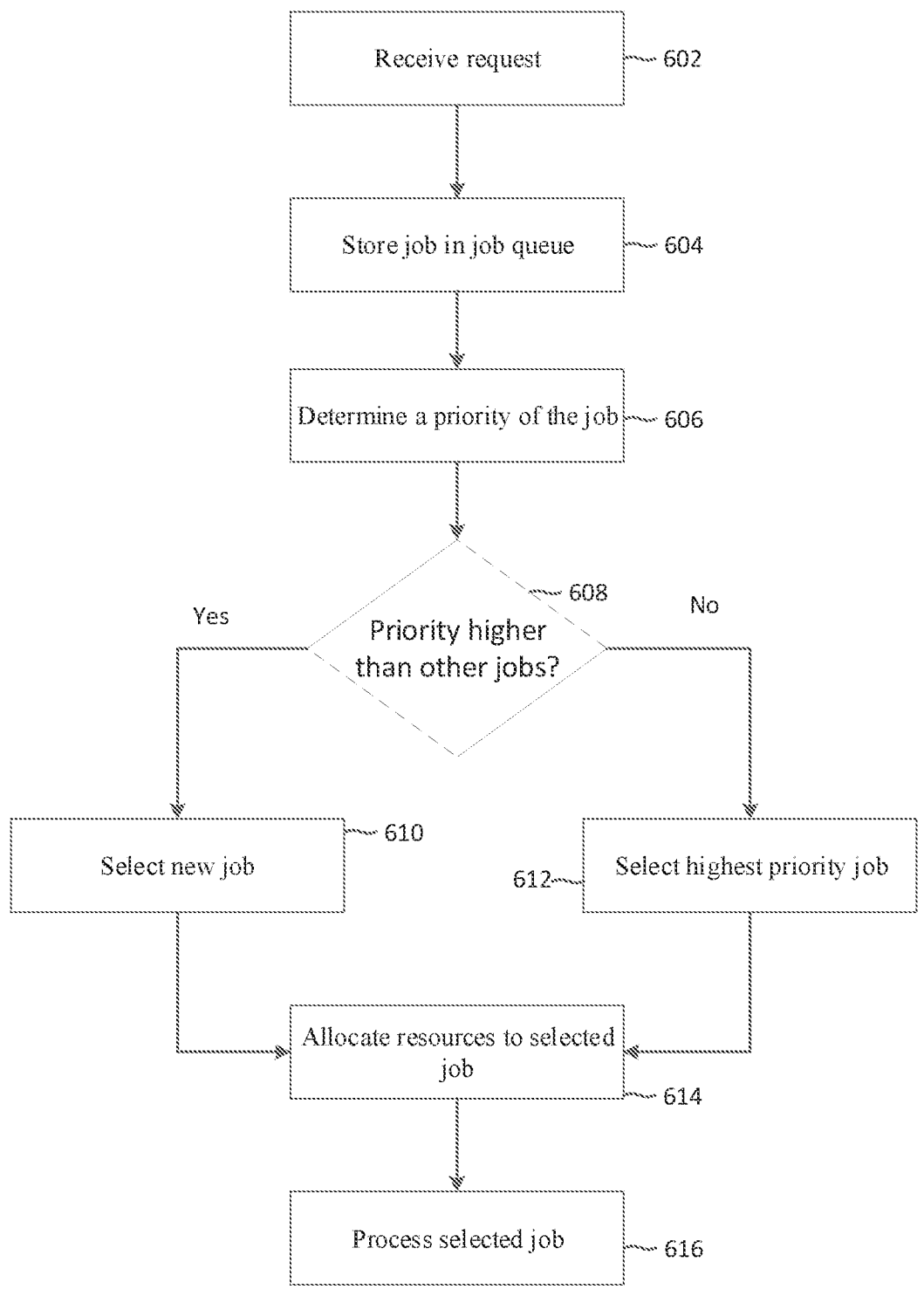
FIG. 6 illustrates a method for creating a job that is scheduled to run across one or more storage nodes in one or more storage clusters according to some embodiments of the present disclosure.

Turning to FIG. 6, a flow diagram of job creation according to some embodiments of the present disclosure is illustrated. Elements of the job creation flow diagram illustrated in FIG. 6 may be found in FIGS. 4 and 5 with respect to creating and running jobs. In the description of FIG. 6, reference is made to elements of FIGS. 1-3 for simplicity of illustration. In an embodiment, the method 600 may be implemented by an exemplary global scheduler 206. In some embodiments, the method 600 may be implemented by the individual global scheduler services 310-332 described above in FIG. 3. It is understood that additional steps can be provided before, during, and after the steps of the method 600, and that some of the steps described can be replaced or eliminated for other embodiments of the method 600.

At block 602, the global scheduler 206 receives a request. The request may be received from the CVS 204. In an embodiment, the GS Scheduler API 310 may receive the request. In some examples, the request may be a volume replication request. The volume replication request may be received after storing a new volume on a storage node 210a-210f. Alternatively, a customer 104, 105 may request a volume replication for an existing volume. In some other examples, the request may be a request to back up a volume, restore a volume, perform a rekey process, or any other request that may performed on an ongoing basis that may benefit from being scheduled.

At block 604, the global scheduler 206 stores a job based on the request in a job queue. In an embodiment, the GS Scheduler API 310 stores the job in GS DB 316 and the DS Dispatcher 320 stores the job in the GS Queue 322. In some embodiments, the job queue may include more than one queue. Each queue in the job queue (e.g., GS Queue 322) may include jobs of a specific type (e.g., volume replication, volume backup, rekey, etc.).

At block 606, the global scheduler 206 determines a priority of the job. In some embodiments, the GS Dispatcher 320 may determine the priority of each job that is scheduled. The priority of the job may be stored in the GS DB 316. The GS Dispatcher 316 may publish jobs of each job type in priority order to the GS Queue 322.

At decision block 608, the global scheduler 206 checks whether the new job has a higher priority than other jobs in the job queue. If it is determined that the new job has a higher priority than other jobs in the job queue, then the method 600 proceeds to block 610. In some embodiments, the determination may be made by the GS Dispatcher 320 when publishing the jobs to the job queue. In some other embodiments, the determination may be made by the GS Core 324 when querying the GS Queue 322 for available jobs.

At block 610, the global scheduler 206 selects the new job created at block 604 to be run. In some embodiments, the GS Core 324 selects the new job from the GS Queue 322. The method 600 then proceeds to block 614, discussed further below.

Returning to decision block 608, if, instead, it is determined that the new job does not have a higher priority than other jobs in the job queue, then the method 600 proceeds to block 612. At block 612, the global scheduler 206 selects the highest priority job from the job queue to run on the storage node. In some embodiments, the GS Core 324 selects the next available job from the GS Queue 322 (in some examples, the jobs might be organized in each queue according to priority so that the highest priority job is next available, while in other examples the jobs might follow a simpler first in, first out approach or similar). In other embodiments, the GS Core 324 determines which job in the GS Queue 322 has the highest priority and the selects that job (e.g., in examples where the queues are simple first in, first out etc.). The method 600 then proceeds to block 614.

At block 614, the global scheduler 206 allocates resources to the selected job. In some embodiments, the GS Manager 326 determines what resources are available and allocates the resources on a storage node to run the selected job. In some examples, the available resources may be SnapMirror sessions available on each storage node. The GS Session Manager 328 may determine which SnapMirror sessions are available. In some examples, the available resources may be bandwidth on the storage node. The Bandwidth Calculator 330 may determine how much bandwidth to allocate to a job. In some examples, the amount of bandwidth may allocated may be increased so that a job may be completed sooner to free up available resources including SnapMirror sessions and bandwidth.

At block 614, the global scheduler 206 sends a message to the storage node 336a-336e with instructions to run the selected job. In some embodiments, the GS Core 324 may send the message to the storage node 336a-336e. In some examples, preparing the selected job may include preempting an already running job that has a lower priority than the selected job. In other examples, the selected job may have a lower priority than the running job. In either case, preempting the already running job improves customer fairness. In some examples, preemption ensures that higher priority jobs run as scheduled. In other examples, preemption ensures that lower priority jobs run and are not consistently skipped in favor of other jobs. For example, when a lower priority job is not run for a threshold period of time the global scheduler 206 may run the lower priority job before a higher priority job and not allow the lower priority job to be preempted. The threshold period of time may also be referred to as lag time, or how far behind schedule the job is currently. The threshold period of time, or lag time, may be measured in minutes, hours, or days. This improves customer fairness by ensuring that all jobs are run within a threshold period of time defined for each job regardless of the priority of the job.

Figure 7:
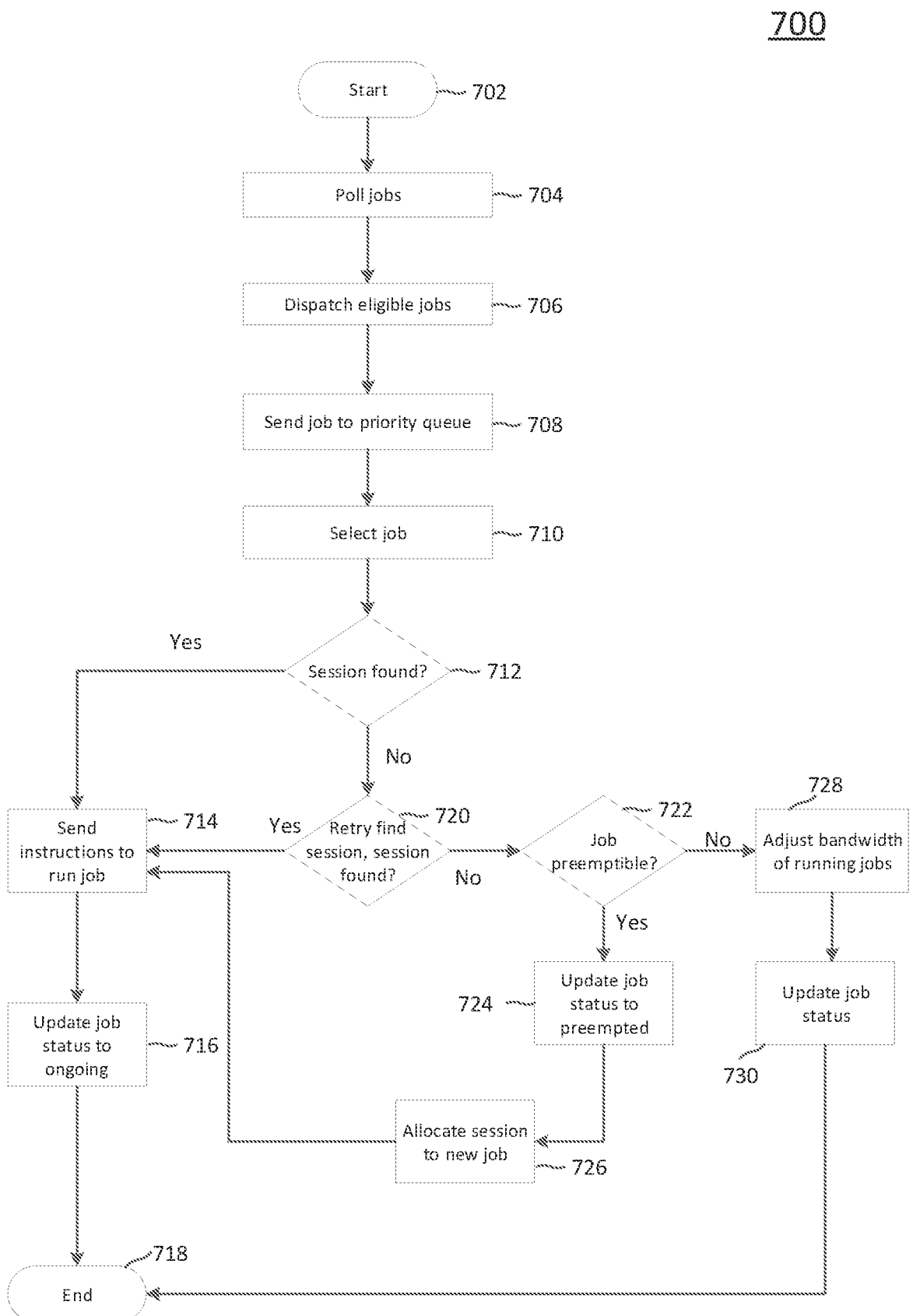
FIG. 7 illustrates a method for processing a job that is scheduled to run across one or more storage nodes in one or more storage clusters according to some embodiments of the present disclosure.

Turning to FIG. 7, a flow diagram of processing a scheduled job according to some embodiments of the present disclosure is illustrated. In the description of FIG. 7, reference is made to elements of FIGS. 1-3 for simplicity of illustration. In an embodiment, the method 700 may be implemented by an exemplary global scheduler 206. In some embodiments, the method 700 may be implemented by the individual global scheduler services 310-332 described above in FIG. 3. It is understood that additional steps can be provided before, during, and after the steps of the method 700, and that some of the steps described can be replaced or eliminated for other embodiments of the method 700. FIG. 7 may be an example of selecting and running jobs as described above with respect to FIG. 6.

At block 704, the global scheduler 206 polls jobs available in the job queue. The GS Dispatcher 320 polls the GS DB 316 for scheduled jobs. In some examples, the GS Dispatcher 320 may poll for one type of scheduled job at a time. In some other examples, the GS Dispatcher 320 may poll for all types of scheduled jobs within a time window.

At block 706, the global scheduler 206 dispatches eligible jobs to a job queue. In some embodiments, the GS Dispatcher 320 may aggregate and separate the eligible jobs by job type. The eligible jobs may be arranged in order of highest priority. In some examples, the GS Dispatcher 320 may determine that a job has been skipped previously and may assign the job a higher priority.

At block 708, the global scheduler 206 sends the jobs to a priority queue. In some embodiments, the GS Dispatcher 320 may send the jobs to the GS Queue 322. The jobs may be stored in separate job queues in the cache of the GS Queue 322 based on the type of job. Using the job queues of the GS Queue 322, the global scheduler 206 may select a job of a specific type based on available resources. For example, there may be multiple initialize sessions available in the initialize pool. The global scheduler 206 may select an initialize type job from the initialize job queue to run using an available initialize session.

At block 710, the global scheduler 206 selects a job from the job queue. In some embodiments, the GS Core 324 may select the job from the GS Queue 322. In some examples, the jobs may be organized in the job queues so that the highest priority job is available next.

At decision block 712, the global scheduler 206 checks whether there are any sessions available on the storage node 210*a*-210*f* to run the job. In some embodiments, the GS Manager 326, and more specifically, the GS Session Manager 328, may determine whether there is a session available to run the job. If it is determined that there is a session available to run the job, the method 700 proceeds to block 714.

At block 714, the global scheduler 206 instructs a node (e.g., node 336*a*) to run the job. In some embodiments, the GS Core 324 sends a message to a node (e.g., node 336*a*) requesting that the node run the job using the available session. In some embodiments, the available session may be a SnapMirror session.

At block 716, the global scheduler 206 updates the job status to ongoing. In some embodiments, the GS Session Manager 328 updates the job status. For example, the GS Session Manager 328 may send a message to the GS Core 324 to update the job status in the GS DB 316.

At block 718, after the global scheduler 206 updates the job status, the method 700 may then return to block 710 to select another job from the jobs queue Returning to decision block 712, if, instead, it is determined that there is not a session available to run the job, the method 700 proceeds to optional decision block 720 if it is implemented. If optional decision block 720 is not implemented, the method 700 proceeds to decision block 722.

At optional decision block 720, the global scheduler 206 checks whether there are any available sessions, again. For example, the global scheduler 206 may wait about 0.5 seconds to about 5 seconds before checking again. The additional check may be performed as a double check as part of customer fairness to ensure that no sessions are available before either skipping the job or preempting another job. If it is determined that there is a session available to run the job, the method 700 proceeds to block 714 where the job is run as described above. If, instead, it is determined that there is not a session available to run the job, the method 700 proceeds to decision block 722.

At decision block 722, the global scheduler 206 checks if a running job is preemptible. In some embodiments, the GS Session Manager 328 determines whether a running job is preemptible. The global scheduler 206 may determine that a running job is preemptible based on at least one of priority, number of times the job has been skipped, and/or job type. If it is determined that a running job is preemptible, the method 700 proceeds to block 724.

At block 724, the global scheduler 206 updates the job status of the running job (i.e., the job to be preempted) to preempted. In some embodiments, the GS Session Manager 328 updates the job status to preempted. For example, the GS Session Manager 328 may send a message to the GS Core 324 to update the status of the job in the GS DB 316 to preempted. The GS Core 324 may pause the preempted job to free the session that is running the preempted job.

At block 726, the global scheduler 206 allocates the now available session to the new job. In some embodiments, the GS Session Manager 328 allocates the session to the job. The GS Core 324 may then instruct the storage node 336*a*-336*e* to use the session to run the job.

Returning to decision block 722, if, instead, it is determined that a running job is not preemptible, the method 700 proceeds to block 728.

At block 728, the global scheduler 206 adjusts the bandwidth of one or more running jobs. The global scheduler 206 may adjust the bandwidth of the one or more running jobs so that the one or more running jobs finishes sooner, thereby freeing a session to run the selected job. In some embodiments, the GS Manager 326 adjusts the bandwidth of the one or more running jobs. The Bandwidth Calculator 330 may provide updated bandwidth values to the GS Manager 326 to assign to the one or more running jobs. The method 700 then proceeds to block 730 without waiting for the one or more running jobs to finish.

At block 730, the global scheduler 206 updates the job status to "unable to find session". In some embodiments, the GS Session Manager 328 updates the job status. For example, the GS Session Manager 328 may send a message to the GS Core 324 to update the job status in the GS DB 316. The method 700 then proceeds to block 718, completing the selected job.

Figure 8:
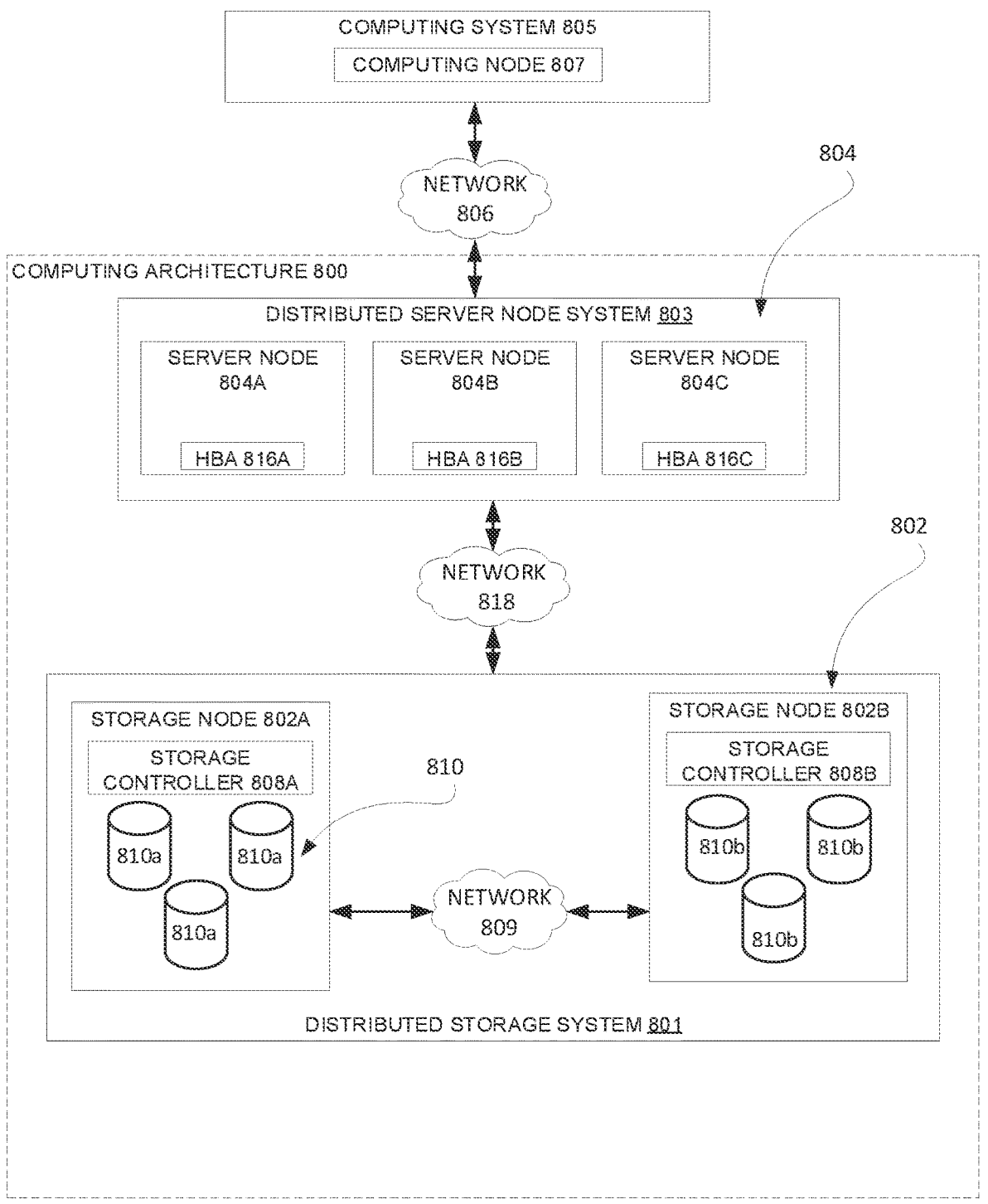
FIG. 8 is an illustration of an exemplary computing architecture according to some embodiments of the present description.

FIG. 8 is an illustration of a computing architecture 800 in accordance with one or more example embodiments. The computing architecture 800 is an example of one manner in which one or more of the computing architectures described herein may be implemented. The computing architecture 800, which, in some cases includes a distributed storage system 801 comprising a number of storage nodes 802 (e.g., storage node 802*a*, storage node 802*b*) in communication with a distributed server node system 803 comprising a number of server nodes 804 (e.g., server node 804*a*, server node 804*b*, server node 804*c*). The distributed storage system 801 and the distributed server node system 803 are examples in which containers, controllers, and/or clusters of the above figures may be implemented, for example. The distributed server node system 803 may be an implementation of the global scheduler GS 206 as described above with respect to FIG. 2 and described in further detail with respect to FIG. 3.

A computing system 805 communicates with the computing architecture 800, and in particular, the distributed server node system 803, via a network 806. The network 806 may include any number of wired communications links, wireless communications links, optical communications links, or combination thereof. In one or more examples, the network 806 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 805 may include, for example, at least one computing node 807. The computing node 807 may be implemented using hardware, software, firmware, or a combination thereof. In one or more other examples, the computing node 807 is a client (or client service, customer, etc.) and the computing system 805 that the client runs on is, for example, a physical server, a workstation, etc.

The storage nodes 802 may be coupled via a network 809, which may include any number of wired communications links, wireless communications links, optical communications links, or a combination thereof. For example, the network 809 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 809 may use a transmission control protocol/Internet protocol (TCP/IP), a remote direct memory access (RDMA) protocol (e.g., Infiniband®, RDMA over Converged Ethernet (RoCE) protocol (e.g., RoCEv1, RoCEv2), iWARP), and/or another type of protocol. Network 809 may be local or remote with respect to a rack or datacenter. Additionally, or in the alternative, the network 809 may extend between sites in a WAN configuration or be a virtual network extending throughout a cloud. Thus, the storage nodes 802 may be as physically close or widely dispersed as needed depending on the application of use. In some examples, the storage nodes 802 are housed in the same racks. In other examples, the storage nodes 802 are located in different facilities at different sites around the world. The distribution and arrangement of the storage nodes 802 may be determined based on cost, fault tolerance, network infrastructure, geography of the server nodes 804, another consideration, or a combination thereof.

The distributed storage system 801 processes data transactions on behalf of other computing systems such as, for example, the one or more server nodes 804. The distributed storage system 801 may receive data transactions from one or more of the server nodes 804 and take an action such as reading, writing, or otherwise accessing the requested data. These data transactions may include server node read requests to read data from the distributed storage system 801 and/or server node write requests to write data to the distributed storage system 801. For example, in response to a request from one of the server nodes 804*a*, 804*b*, or 804*c*, one or more of the storage nodes 802 of the distributed storage system 801 may return requested data, a status indictor, some other type of requested information, or a combination thereof, to the requesting server node. While two storage nodes 802*a* and 802*b* and three server nodes 804*a*, 804*b*, and 804*c* are shown in FIG. 8, it is understood that any number of server nodes 804 may be in communication with any number of storage nodes 802. A request received from a server node, such as one of the server nodes 804*a*, 804*b*, or 804*c* may originate from, for example, the computing node 807 (e.g., a client service implemented within the computing node 807) or may be generated in response to a request received from the computing node 807 (e.g., a client service implemented within the computing node 807).

While each of the server nodes 804 and each of the storage nodes 802 is referred to as a singular entity, a server node (e.g., server node 804*a*, server node 804*b*, or server node 804*c*) or a storage node (e.g., storage node 802*a*, or storage node 802*b*) may be implemented on any number of computing devices ranging from a single computing system to a cluster of computing systems in communication with each other. In one or more examples, one or more of the server nodes 804 may be run on a single computing system, which includes at least one processor such as a microcontroller or a central processing unit (CPU) operable to perform various computing instructions that are stored in at least one memory. In one or more examples, at least one of the server nodes 804 and at least one of the storage nodes 802 reads and executes computer readable code to perform the methods described further herein to orchestrate parallel file systems. The instructions may, when executed by one or more processors, cause the one or more processors to perform various operations described herein in connection with examples of the present disclosure. Instructions may also be referred to as code, as noted above.

A processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); at least one network interface such as an Ethernet interface, a wireless interface (e.g., IEEE 802.11 or other suitable standard), a SAN interface, a Fibre Channel interface, an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 802 contains any number of storage devices 810 for storing data and can respond to data transactions by the one or more server nodes 804 so that the storage devices 810 appear to be directly connected (i.e., local) to the server nodes 804. For example, the storage node 802*a* may include one or more storage devices 810*a* and the storage node 802*b* may include one or more storage devices 810*b*. In various examples, the storage devices 810 include HDDs, SSDs, and/or any other suitable volatile or non-volatile data storage medium. In some examples, the storage devices 810 may be relatively homogeneous (e.g., having the same manufacturer, model, configuration, or a combination thereof). However, in other examples, one or both of the storage node 802*a* and the storage node 802*b* may alternatively include a heterogeneous set of storage devices 810*a* or a heterogeneous set of storage device 810*b*, respectively, that includes storage devices of different media types from different manufacturers with notably different performance.

The storage devices 810 in each of the storage nodes 802 are in communication with one or more storage controllers 808. In one or more examples, the storage devices 810*a* of the storage node 802*a* are in communication with the storage controller 808*a*, while the storage devices 810*b* of the storage node 802*b* are in communication with the storage controller 808*b*. While a single storage controller (e.g., 808*a*, 808*b*) is shown inside each of the storage node 802*a* and 802*b*, respectively, it is understood that one or more storage controllers may be present within each of the storage nodes 802*a* and 802*b*.

The storage controllers 808 exercise low-level control over the storage devices 810 in order to perform data transactions on behalf of the server nodes 804, and in so doing, may group the storage devices 810 for speed and/or redundancy using a protocol such as RAID (Redundant Array of Independent/Inexpensive Disks). The grouping protocol may also provide virtualization of the grouped storage devices 810. At a high level, virtualization includes mapping physical addresses of the storage devices 810 into a virtual address space and presenting the virtual address space to the server nodes 804, other storage nodes 802, and other requestors. Accordingly, each of the storage nodes 802 may represent a group of storage devices as a volume. A requestor can therefore access data within a volume without concern for how it is distributed among the underlying storage devices 810.

The distributed storage system 801 may group the storage devices 810 for speed and/or redundancy using a virtualization technique such as RAID or disk pooling (that may utilize a RAID level). The storage controllers 808*a* and 808*b* are illustrative only; more or fewer may be used in various examples. In some cases, the distributed storage system 801 may also be communicatively coupled to a user display for displaying diagnostic information, application output, and/or other suitable data.

With respect to the distributed server node system 803, each of the one or more server nodes 804 includes any computing resource that is operable to communicate with the distributed storage system 801, such as by providing server node read requests and server node write requests to the distributed storage system 801. In one or more examples, each of the server nodes 804 is a physical server as described above in FIG. 1. In some examples, each of the server nodes 804 may be an implementation of one or more cloud resources 118, 120, 122 within cloud system 106. For example, the nodes 804 may be different logical nodes within the cloud system 106. As another example, the nodes 804 may be physical nodes with one or more nodes 804 implemented in the cloud system 106 and one or more nodes 804 implemented at customer site. In one or more examples, each of the server nodes 804 includes one or more host bus adapters (HBA) 816 in communication with the distributed storage system 801. The HBA 816 may provide, for example, an interface for communicating with the storage controllers 808 of the distributed storage system 801, and in that regard, may conform to any suitable hardware and/or software protocol. In various examples, the HBAs 816 include Serial Attached SCSI (SAS), iSCSI, InfiniBand®, Fibre Channel, and/or Fibre Channel over Ethernet (FCoE) bus adapters. Other suitable protocols include SATA, eSATA, PATA, USB, and FireWire.

The HBAs 816 of the server nodes 804 may be coupled to the distributed storage system 801 by a network 818 comprising any number of wired communications links, wireless communications links, optical communications links, or combination thereof. For example, the network 818 may include a direct connection (e.g., a single wire or other point-to-point connection), a networked connection, or any combination thereof. Examples of suitable network architectures for the network 818 include a LAN, an Ethernet subnet, a PCI or PCIe subnet, a switched PCIe subnet, a WAN, a MAN, the Internet, Fibre Channel, or the like. In many examples, a server node 804 may have multiple communications links with a single distributed storage system 801 for redundancy. The multiple links may be provided by a single HBA 816 or multiple HBAs 816 within the server nodes 804. In some examples, the multiple links operate in parallel to increase bandwidth.

In one or more examples, each of the server nodes 804 may have another HBA that is used for communication with the computing system 805 (e.g., customers 104, 105 illustrated in FIG. 1) over the network 807. In other examples, each of the server nodes 804 may have some other type of adapter or interface for communication with the computing system 805 over the network 807.

To interact with (e.g., write, read, modify, etc.) remote data, a HBA 816 sends one or more data transactions to the distributed storage system 801. In some examples, the distributed storage system 801 may be an example of clusters 208 as described above in FIG. 2. In some other examples, each storage node 802 may be an example of a cluster 208. Data transactions are requests to write, read, or otherwise access data stored within a volume in the distributed storage system 801, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 801 executes the data transactions on behalf of the server nodes 804 by writing, reading, or otherwise accessing data on the relevant storage devices 810. A distributed storage system 801 may also execute data transactions based on applications running on the distributed server node system 803. For some data transactions, the distributed storage system 801 formulates a response that may include requested data, status indicators, error messages, and/or other suitable data and provides the response to the provider of the transaction.

In one or more examples, an orchestration system may be a container orchestration system that enables file system services to be run in containers and volumes to be mounted from the distributed storage system 801 to the distributed server node system 803, in particular according to embodiments of the present disclosure.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   periodically receiving, by a global scheduler, information about one or more resources of a first storage node and one or more resources of a second storage node, wherein the global scheduler is external to, and handles job scheduling for, multiple storage operating systems running on multiple storage nodes across one or more clusters based on a view across at least one of clusters or regions including the periodically receiving the information about the one or more resources available on the first storage node and on the second storage node;

receiving, by the global scheduler, a request to replicate a volume from the first storage node to the second storage node;

storing, by the global scheduler, a new job in a global job queue external to the multiple storage operating systems running on the multiple storage nodes and based on the request to replicate the volume, the global job queue including at least one other job;

allocating, by the global scheduler, at least a first subset of resources of the first storage node from the one or more resources of the first storage node, and at least a second subset of resources of the second storage node from the one or more resources of the second storage node, to the new job based on the received information about the one or more resources of the first node and the second node, and in response to determining that the new job has a higher priority than the at least one other job in the global job queue; and sending, by the global scheduler, an instruction to the first storage node and the second storage node for local schedulers that are part of storage operating systems at the first and second nodes, from among the multiple storage operating systems, to run the new job.

2. The method of claim 1, wherein the first storage node belongs to a first cluster of storage nodes and the second storage node belongs to a second cluster of storage nodes, wherein the new job and the at least one other job are configured to run in sessions hosted across different storage nodes.

3. The method of claim 1, further comprising:

identifying, by the global scheduler, available resources of the first storage node that are able to perform the new job, the available resources including one of volume replication sessions and bandwidth.

4. The method of claim 1, wherein:

the receiving the request is performed by a first service of the global scheduler, the determining that the new job has the higher priority is performed by a second service of the global scheduler that is different than the first service, and the periodically receiving the information is performed by a third service of the global scheduler that is different than the first and second services.

5. The method of claim 1, further comprising:

preempting, by the global scheduler, a second job being run based on a determination that the new job has a higher priority than the second job.

6. The method of claim 1, wherein:

the one or more resources of the first storage node include a first plurality of sessions, each session configured to run the new job to replicate the volume, the one or more resources of the second storage node include a second plurality of sessions, and the allocating further comprises decreasing a session availability count at both the first storage node and the second storage node.

7. The method of claim 1, further comprising:

determining, by the global scheduler, that a second job in the global job queue has not been run for a period of time; and sending, by the global scheduler, a second instruction to run the second job before the new job in response to the determination that the second job has not run for a threshold period of time.

8. A computing device comprising:

a memory containing machine readable medium comprising machine executable code having stored thereon instructions for performing a method of scheduling jobs across a plurality of storage nodes, the instructions being external to multiple storage operating systems running on the plurality of storage nodes; and a processor coupled to the memory, the processor configured to execute the machine executable code to cause the processor to:

periodically send a request for information about one or more resources of a first storage node of the plurality of storage nodes and one or more resources of a second storage node of the plurality of storage nodes;

periodically receive, in response to the request, the information about the one or more resources of the first storage node and the one or more resources of the second storage node;

receive a request to perform a task according to a schedule;

store a first job in a global job queue external to the multiple storage operating systems running on the plurality of storage nodes, the first job being based on the request to perform the task, and the global job queue including at least one other job;

pause a second job in response to a determination that there are insufficient resources to run the first job and in response to the received information about the one or more resources of the first storage node and the second storage node, the second job having a lower priority than the first job;

allocate a first subset of the one or more resources of the first storage node, and a second subset of the one or more resources of the second storage node, being used by the second job to the first job in response to the pausing the second job; and send messages to each of the first storage node and the second storage node to initiate the first job using the one or more resources of the first and second storage nodes through local schedulers that are part of storage operating systems at the first and second storage nodes, from among the multiple storage operating systems, allocated to the first job.

9. The computing device of claim 8, wherein the first storage node belongs to a first storage cluster, the second storage node belongs to a second storage cluster, and the first job includes replicating a volume from the first storage node to the second storage node.

10. The computing device of claim 8, wherein the processor is further configured to:

send a resume message to each of the first storage node and the second storage node to resume the second job in response to the first job completing.

11. The computing device of claim 8, wherein the processor is further configured to:

identify, based on the periodically received information, available resources on the first and second storage nodes suitable to run the first job, the available resources including one of volume replication sessions and bandwidth.

12. The computing device of claim 8, wherein the processor is further configured to:

identify an available session on the first and second storage nodes of the plurality of storage nodes; and allocate the available session to the first and second storage nodes to run the first job.

13. The computing device of claim 8, wherein the processor is further configured to:

identify a third job from the at least one other job in the global job queue that has exceeded a threshold for time passed since successfully completed according to a schedule of the third job; and initiate the third job on a storage node of the plurality of storage nodes.

14. The computing device of claim 8, wherein the processor is further configured to:

adjust bandwidth allocated to a third job running on the plurality of storage nodes to enable the third job to complete sooner and free one or more resources for the first job.

15. A non-transitory machine-readable medium having stored thereon instructions for performing a method of scheduling jobs across a plurality of storage nodes, the instructions for performing the method being external to multiple storage operating systems running on the plurality of storage nodes, which when executed by at least one machine, causes the at least one machine to:

periodically receive information about one or more resources of a first storage node and one or more resources of a second storage node from the plurality of storage nodes;

receive a request to run a first job according to a provided schedule;

publish the first job to a global job queue external to the multiple storage operating systems running on the plurality of storage nodes, the global job queue being one of a plurality of global job queues, the global job queue including a plurality of jobs of a similar type to the first job;

allocate, in response to determining the first job has a higher priority than a second job of the plurality of jobs and in response to the received information about the one or more resources of the first and second storage nodes, an additional amount of bandwidth to the first job of the plurality of jobs to complete the first job, the second job requiring a session on the first and second storage nodes of the plurality of storage nodes, the session comprising at least a part of the one or more resources of the first and second storage nodes; and send an instruction to the first and second storage nodes for local schedulers of the first and second storage nodes of the plurality of storage nodes to run the second job after the first job has completed.

16. The non-transitory machine-readable medium of claim 15, further comprising machine executable code that causes the machine to:

determine, before allocating the additional amount of bandwidth to the first job, that a session is not available to run the first job; and allocate the session run by the second job to the first job.

17. The non-transitory machine-readable medium of claim 15, further comprising machine executable code that causes the machine to:

identify available resources, based on the information about the one or more resources of the first storage node, to run the first job, the first job including replicating a volume from the first storage node to the second storage node;

identify, based on the information about the one or more resources of the second storage node, available resources on the second storage node to run the first job;

allocate resources on the first storage node to run the first job; and allocate resources on the second storage node to run the first job.

18. The non-transitory machine-readable medium of claim 15, wherein the first job includes replicating a volume from the first storage node to the second storage node, the second storage node being in a different storage cluster than the first storage node.

19. The non-transitory machine-readable medium of claim 15, further comprising machine executable code that causes the machine to:

update a status of the first job in a first database;

poll the first database for a status update; and update the status of the first job in a second database in response to receiving the status update from the first database.

20. The non-transitory machine-readable medium of claim 15, further comprising machine executable code that causes the machine to:

query, before publishing the first job to the global job queue, a database including the plurality of jobs;

determine a subset of the plurality of jobs that are eligible to be scheduled; and publish the subset of the plurality of jobs to the global job queue in priority order, the subset including the first job.

* * * * *